US009277741B2

(12) United States Patent
Kubacak

(10) Patent No.: US 9,277,741 B2
(45) Date of Patent: Mar. 8, 2016

(54) METHOD AND APPARATUS FOR A SPRAY SYSTEM

(76) Inventor: Johnny Lee Kubacak, Brady, TX (US)

( * ) Notice: Subject to any disclaimer, the term of this patent is extended or adjusted under 35 U.S.C. 154(b) by 1928 days.

(21) Appl. No.: 12/321,125

(22) Filed: Jan. 15, 2009

(65) Prior Publication Data

US 2010/0175316 A1 Jul. 15, 2010

(51) Int. Cl.
| | |
|---|---|
| *A01G 25/09* | (2006.01) |
| *A01M 7/00* | (2006.01) |
| *A01M 21/04* | (2006.01) |
| *B05B 15/08* | (2006.01) |
| *B05B 17/06* | (2006.01) |
| *B05B 1/14* | (2006.01) |
| *B05B 15/06* | (2006.01) |

(52) U.S. Cl.
CPC ............. *A01M 7/0082* (2013.01); *A01M 7/006* (2013.01); *A01M 21/043* (2013.01); *B05B 15/08* (2013.01); *B05B 17/0607* (2013.01); *B05B 1/14* (2013.01); *B05B 15/061* (2013.01)

(58) Field of Classification Search
CPC ... A01M 7/005; A01M 7/006; A01M 7/0014; A01M 21/00; A01M 21/04; A01M 21/043; A01M 9/003; A01M 11/00; A01G 25/09; B05B 7/0075; B05B 9/007

USPC ........ 47/1.5, 48.5; 239/77, 78, 146, 172, 557, 239/556

See application file for complete search history.

(56) References Cited

FOREIGN PATENT DOCUMENTS

| | | | |
|---|---|---|---|
| CA | 508283 | 12/1954 | .................... 239/176 |
| DE | 535493 | 10/1931 | .................... 239/162 |
| GB | 567218 | 2/1945 | .................... 239/162 |
| GB | 895023 | 4/1962 | .................... 239/172 |

*Primary Examiner* — Trinh Nguyen
(74) *Attorney, Agent, or Firm* — Christopher L. Makay

(57) ABSTRACT

An improvement to a roadside sprayer fixates spray nozzles on a registration plate. The registration plate may include integral tabs depending on the application. Inclination of the tabs is adjustable to place streams and droplets in a desired swath coverage. With the nozzles rigidly mounted onto the plate, the entire plate is nutated. The use of the registration plate in a spray unit creates a uniform nutation among the nozzles, thereby reducing variability in droplet placement, and providing a more predictable spray from the nozzles. In other embodiments, the spray unit is utilized in a spray system adaptable to service vehicles, and may be utilized in conjunction with a vegetation engagement device, such as a cutter to engage multiple zones of a roadway right-of-way. Additionally, an improved spray unit includes an electromagnetic field and an attractor to generate plate motion.

13 Claims, 31 Drawing Sheets

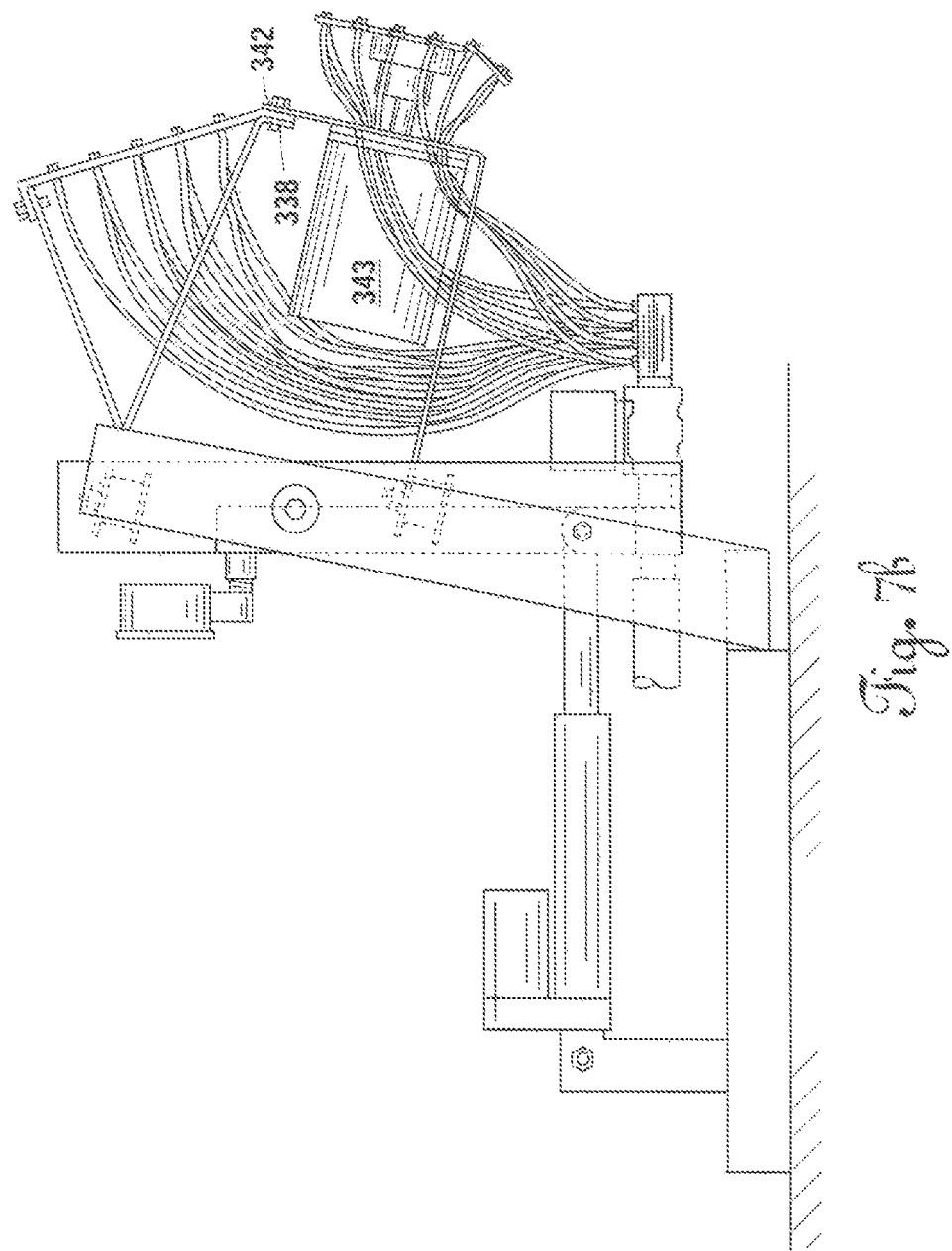

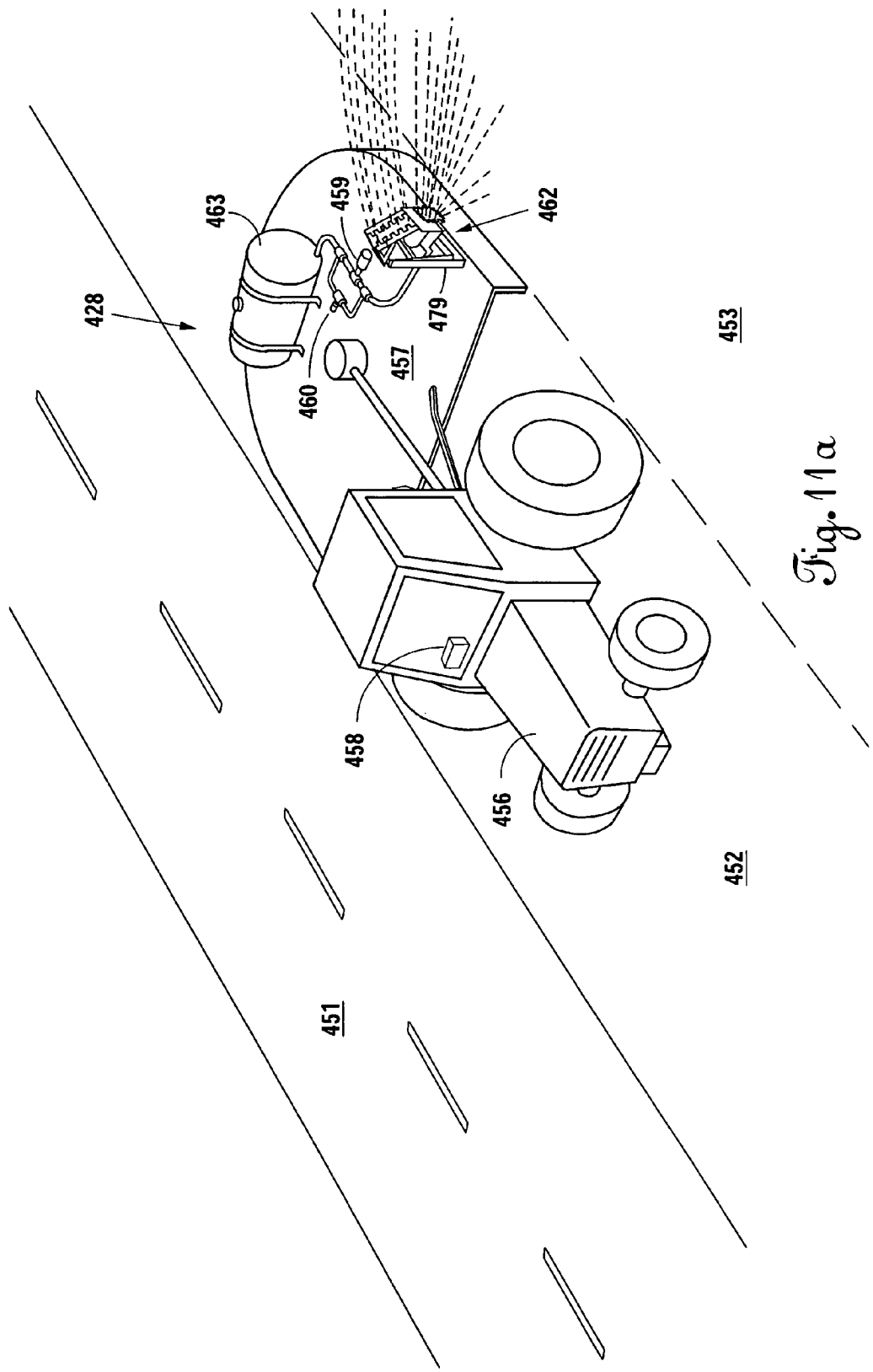

Figure 11B:
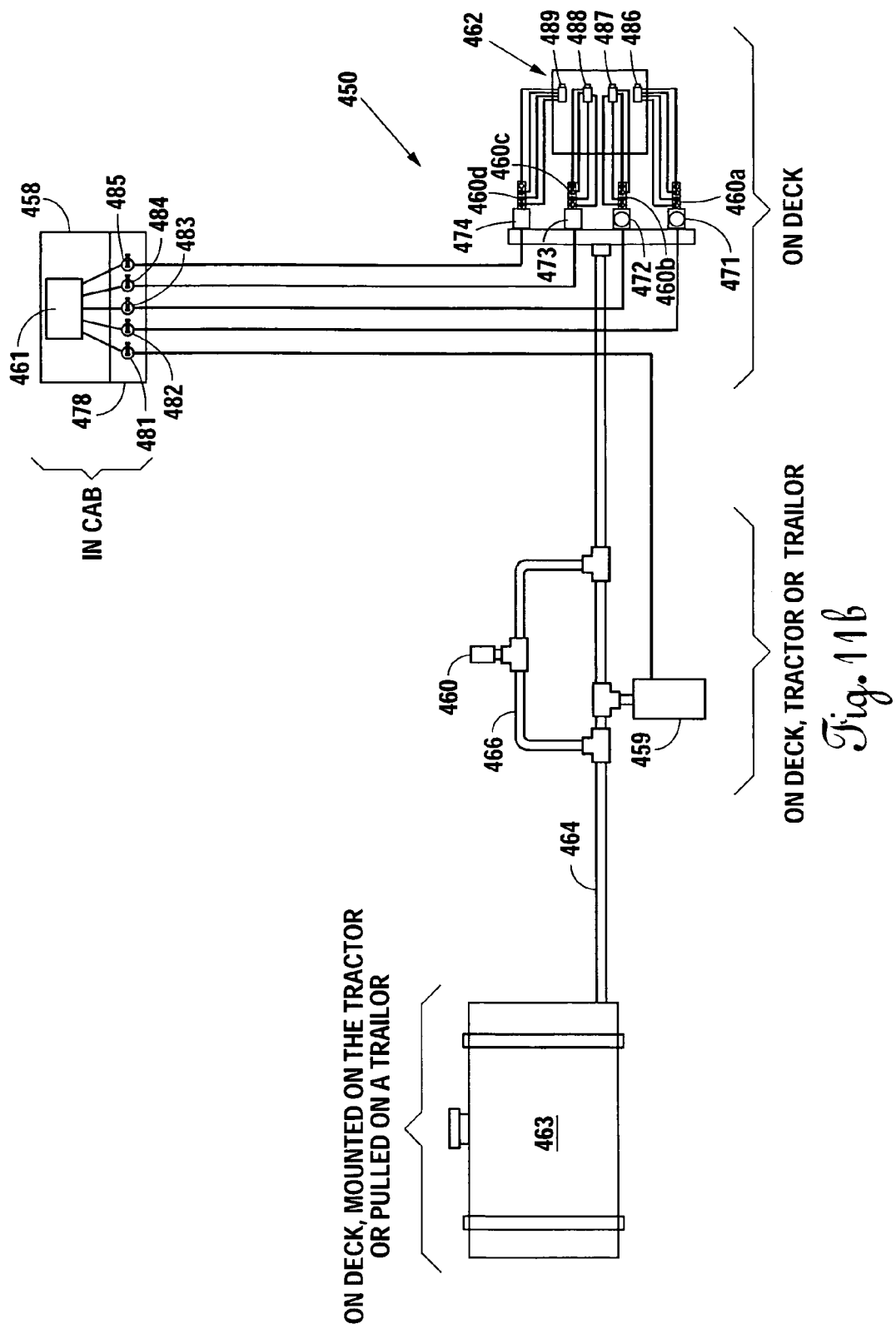

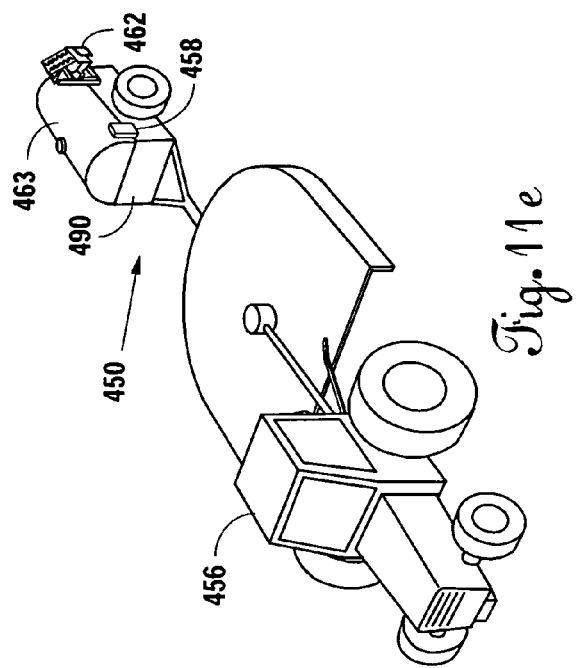
Fig. 11e
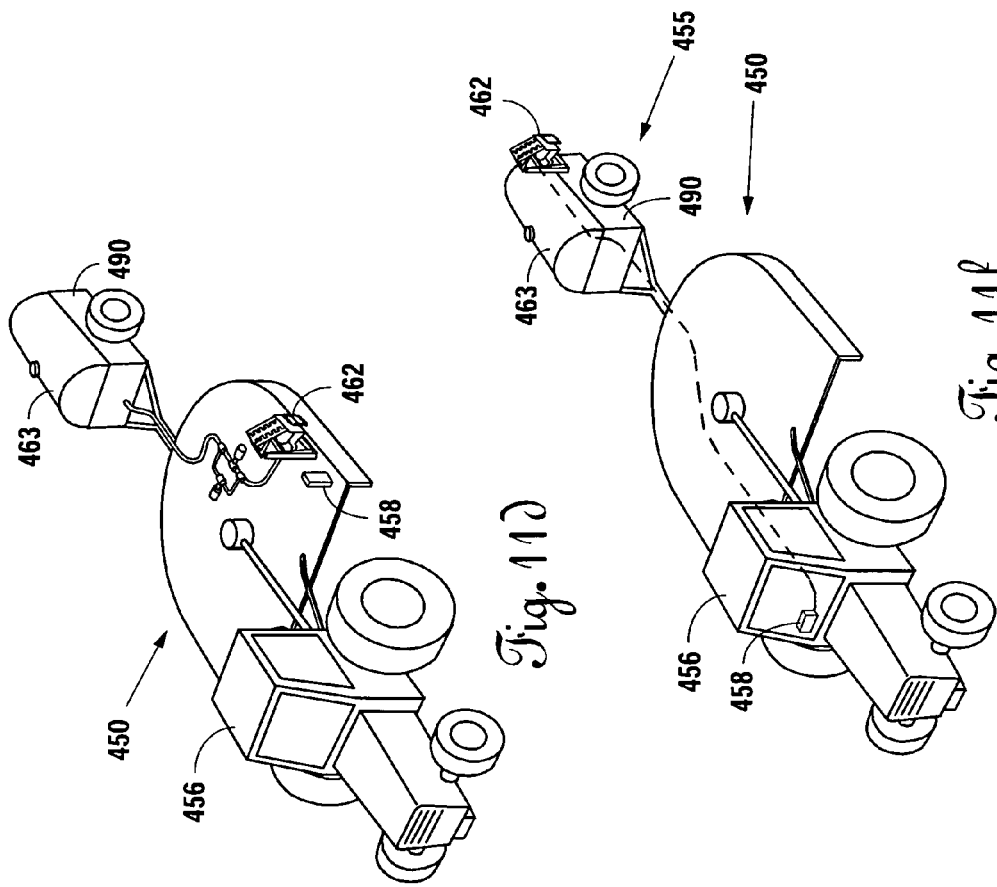
Fig. 11d
Fig. 11f

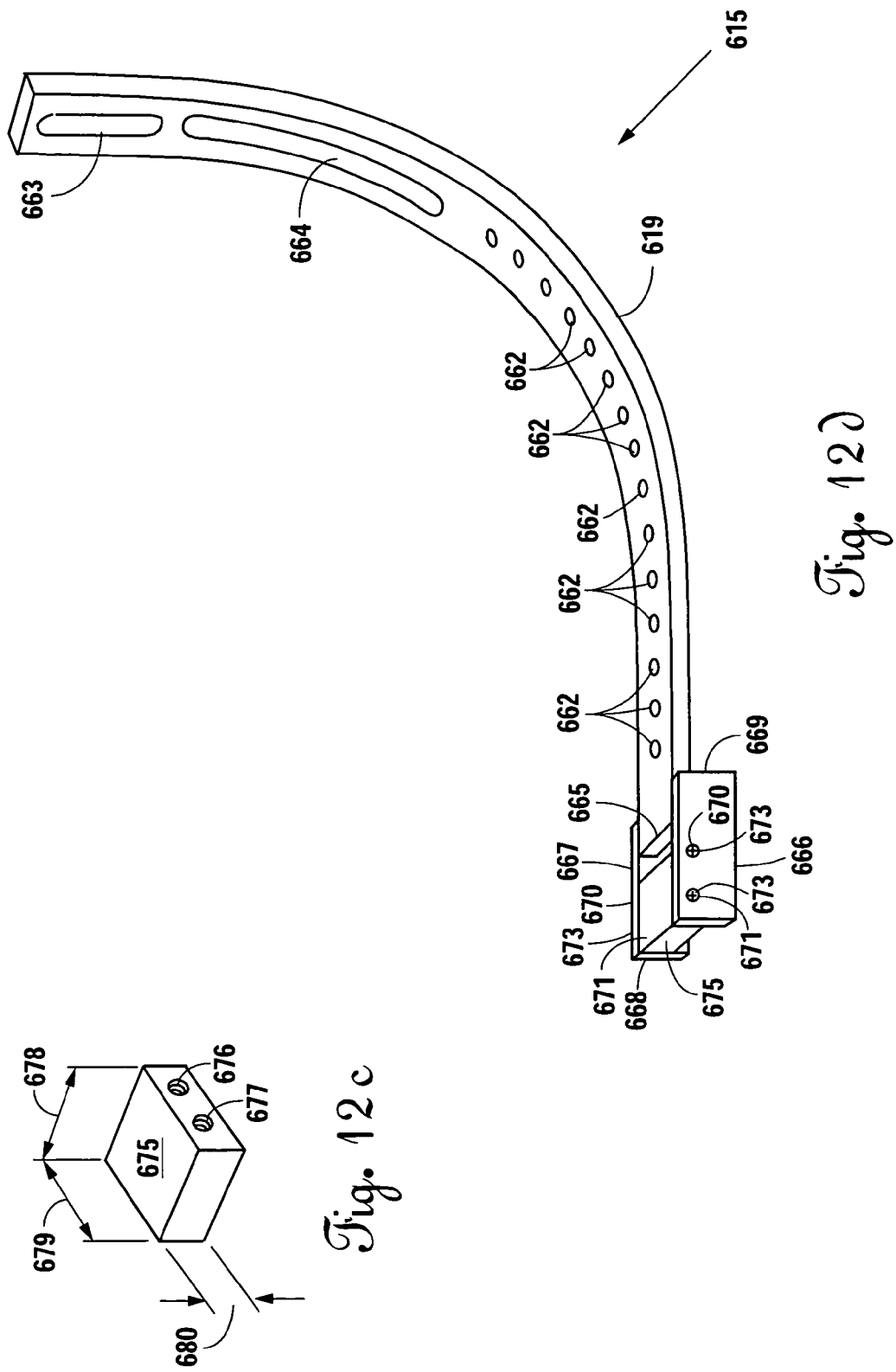

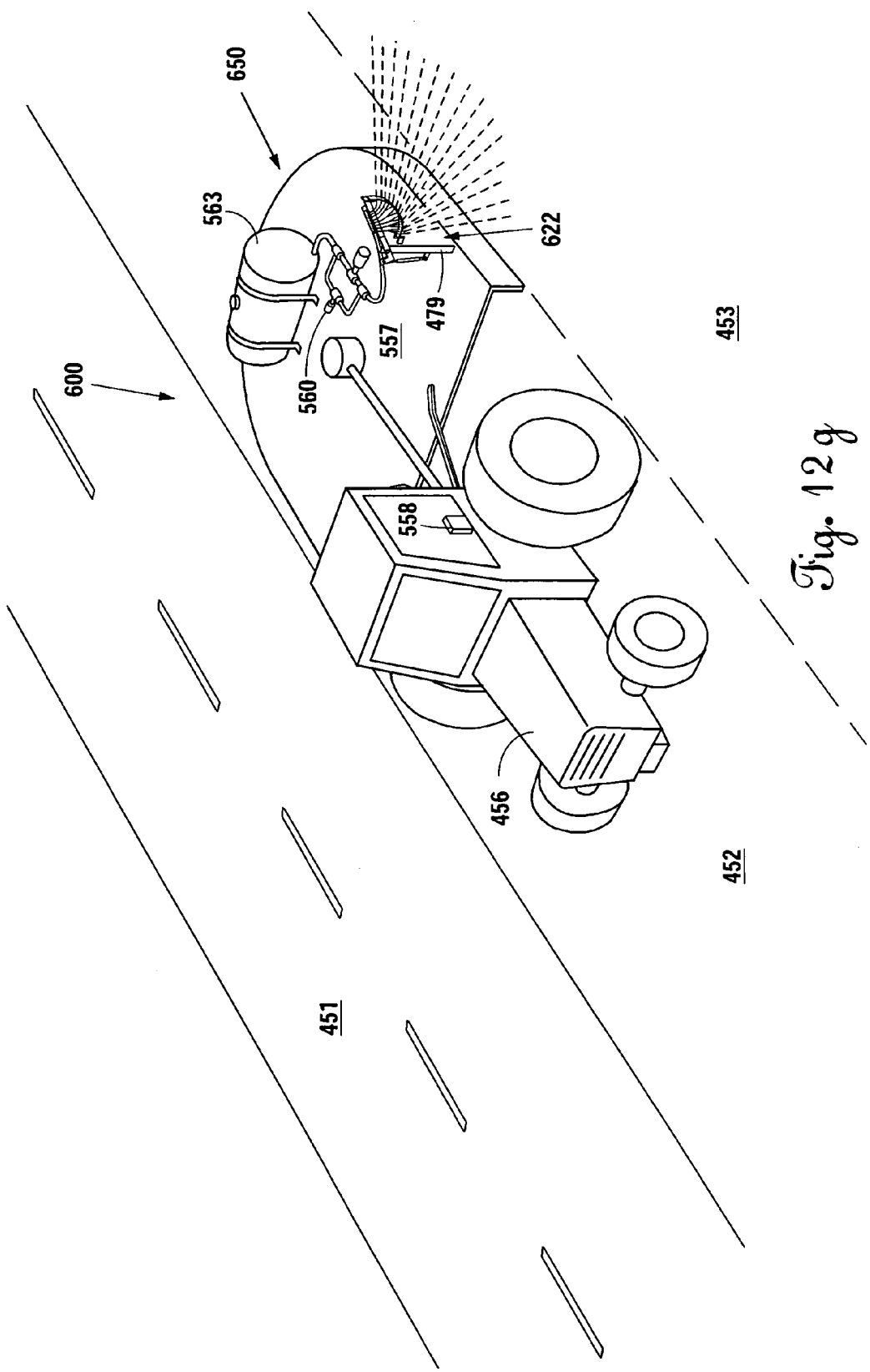

METHOD AND APPARATUS FOR A SPRAY SYSTEM

BACKGROUND OF THE INVENTION

1. Field of the Invention

The present invention relates to a spray apparatus and more particularly to an automated apparatus for spraying herbicides on roadsides and other right-of-ways. The sprayer is mounted to a vehicle and is controlled by the operator of the vehicle.

2. Description of the Related Art

A right-of-way sprayer typically includes a tank for storing the herbicide and a dilution source, normally water, also stored in a tank. The herbicide and dilution sources are connected to a water pump where a mix occurs. The mix is then fed into a manifold controlled by solenoids that allow the operator to direct the flow of the mix. After traveling through the manifold, the mixture is fed through a series of hoses to individual nozzles, which mount on the ends of the plastic hoses. The nozzles are then mounted on a common platform called a spray head. The spray head can be nutated by any suitable means such as an electric vibrator to create droplet separation at the nozzles.

The spray head, as well as the nozzles, may be remotely controlled by a vehicle operator, or a weed sensor may be utilized to determine the presence of vegetation. The vehicle operator can change the position of the spray head through the use of a power unit, such as an electric, air, or hydraulic cylinder to change the inclination of the spray head as the cylinder extends or contracts. In addition, individual swaths or nozzles can be controlled by the operator using a single switch, or any combination of switches to achieve a desired spray swath. The switches control the delivery of power to solenoids connected to the manifold. The ability to control the delivery of product to the nozzles using the switch allows the operator to provide a number of different swath patterns according to the type of application preferred. Also, a roadside sprayer may include a means of sensing vehicle speed, such as a ground based radar, or global positioning system (GPS), to help the operator to regulate the speed of the vehicle and the application rate of chemical.

Current right-of-way sprayers provide several advantages. The sprayers allow for a plurality of individual nozzles to cover swaths at different distances from the vehicle. Also, the nutation speed of the spray head may be adjustable to compensate for wind and to minimize drift, thereby achieving more uniform spray coverage. The spray head can also be positioned at different angles to produce the desired swaths.

However, in current right-of-way sprayers, the nozzles are not rigidly mounted on the spray head. Instead, the nozzles are threaded into ninety-degree elbows. The elbows are threaded into a series of common manifolds holding sets of spray nozzles. Hoses carry fluid from a remote system of solenoids to the manifolds holding the sets of spray nozzles. This lack of a rigid mounting system for the nozzles can cause several problems. Illustratively, the lack of rigid mounting for the nozzles can create a disproportionate level of nutation in the nozzles. The lack of uniformity in the level of nozzle nutation creates a varying level of droplet sizes among nozzles designed to nutate at the same rate, thereby affecting swath coverage and the saturation level of the herbicide.

Additionally, nutation of the spray head forces the elbows to rotate with respect to the manifolds, thereby moving the nozzles out of position. In this instance, a spray stream emitted from a nozzle overlaps an adjacent nozzle. In this situation, the chemical is applied unevenly, and the reoriented nozzle produces a spray pattern that lacks uniformity.

Also, as the ends of the nozzles are not rigidly attached to a rigid structure, the nozzles may point and direct spray to unintended locations producing undesirable swath coverage. The lack of a rigid mounting system also increases the potential of causing nozzles to vibrate loose from their mounting points.

Still further, the remotely located solenoids create issues with residual product disposed within fluid circuits located beyond the flow control shut-offs. Illustratively, remotely located flow control units leave large quantities of product disposed within the fluid system after a spray. The residual fluid remains in the pressurized hoses, and then seeps out of the system as the hoses contract due to the pressure loss. The residual fluid may also drip out of the system during a change in the orientation of the system components, such as during a retraction, thereby delivering unintended drippage, possibly on desirable turf.

Still, yet further, the prior art utilizes a spray head including high-weight components. As such, a motion inducer is forced to work in a high working load range, thereby increasing the rate of motor and bearing failures.

Accordingly, a right-of-way sprayer that produces more uniform motion among nozzles, and prevents moving nozzles from pointing in unintended directions, would enable more consistent and accurate swath coverage. Moreover, a fixed nozzle mounting system would reduce nozzle vibration, ensuring that nozzles remain in their mounting points.

SUMMARY OF THE INVENTION

In accordance with the present invention, a right-of-way sprayer mounts the nozzles in a fixed and integral position on a common registration plate. The registration plate is monolithic, and is rigidly mounted to the spray head using support brackets. The registration plate may include a primary face and mounting tabs. The tabs can either be external to the primary face or cut out internally within the primary face of the registration plate depending on the application. The tabs may be coplanar with the primary face or can be angled or moved to create a desired swath coverage. Alternatively, the tabs may be reoriented to modify the spray pattern. With the nozzles rigidly mounted onto the plate, the entire plate is vibrated or nutated. The registration plate is rigid enough to maintain shape during a motion event, yet malleable enough to allow the tabs to be reoriented to adjust the spray pattern. The placement of the nozzles into the monolithic registration plate creates uniform motion among the nozzles. It is therefore an object of the present invention to mount the nozzles on the common registration plate, thereby preventing the nozzles from vibrating or nutating at levels that are not uniform.

Rigidly mounting the nozzles onto the monolithic registration plate provides the present invention with certain advantages. Having the nozzles rigidly mounted onto a common registration plate provides a more uniform nozzle motion and prevents nozzles from extending to undesired directions due to loosening of separate tabs during a motion event. Providing more uniform motion lessens the variability in droplet size, thereby producing a more accurate spray from the nozzles. Both of these measures aid in providing for more consistent swath coverage. More consistent swath coverage in the sprayer further provides the added benefit of reducing the cost of raw materials, such as herbicide, by enabling operators to more accurately predict an amount of herbicide required for a given application. Furthermore, having the ends of the nozzles securely mounted onto the single piece registration plate eliminates the possibility of the nozzles vibrating free, thereby cutting operating and maintenance costs due to machine failures.

Additional advantages include the relocation of solenoids closer to the registration plates, thereby reducing a residual flow system length to minimize the amount of fluid remaining within the residual flow system after shut-off. This feature, in combination with a reduced hose diameter, further reduces the amount of fluid remaining in the residual flow system, thereby reducing accidental drippage potential. The system further includes a reduced weight, approximately one-third of the predecessor, thereby allowing the spray head to vibrate or nutate at higher speeds with less damage due to friction on the bearings and motors of the spray head.

In a third embodiment, a spray head similar to the first embodiment is utilized in a spray system, wherein the spray system is utilized in combination with a vegetation engagement device to create a vegetation engagement system for treating multiple zones of a right-of-way. Illustratively, a first engagement zone is cut, and a second engagement zone is sprayed.

In a fourth embodiment, an improved spray unit is utilized in the vegetation engagement system disclosed in the third embodiment, and extensions thereof. The improvement includes a spray arm resistant to corrosion by chemicals, wherein the spray unit includes an electromagnetic field and an attractor secured to the spray arm, wherein the electromagnetic field forces the spray arm to move, thereby aiding droplet formation.

The present invention has other objects, features, and advantages that the following will evidence to those familiar with the art. This scope defines the invention broadly, thus allowing for the inclusion of any combination of related features, elements, or steps described herein as a part of its scope.

BRIEF DESCRIPTION OF THE DRAWINGS

FIG. 1*a* is an isometric view for a right-of-way spray system according to a first embodiment.

FIG. 1*b* is a side view of the right-of-way spray system according to the first embodiment.

FIG. 2*a* shows a perspective view of an inner frame and manifold according to the first embodiment.

FIG. 2*b* provides a rear perspective view of the manifold and flow control units according to the first embodiment.

FIG. 2*c* provides an exploded view of a motion inducer including a cam disposed at an angle to an offset motor shaft according to the first embodiment.

FIG. 2*d* provides a section view of the motion inducer according to the first embodiment.

FIG. 2*e* provides a section view of an axial relationship between the motor and the cam according to the first embodiment.

FIG. 2*f* provides a partially exploded view of the motion inducer setup for generating motion in multiple planes according to the first embodiment.

FIG. 2*g* provides a top view of an axial relationship between the motor and the cam, and a registration plate according to the alternative motion setup of the first embodiment.

FIG. 2*h* provides a top view of an axial relationship between the motor and the cam, and a registration plate according to a second alternative motion setup of the first embodiment.

FIG. 3*a* shows a perspective view of the first and second registration plates according to the first embodiment.

FIG. 3*b* provides a perspective view of the first through seventh flow control units according to the first embodiment.

FIG. 4 illustrates a flow system from flow control units to nozzles according to the first embodiment.

FIG. 5*a* illustrates a control system for the right-of-way spray system according to the present invention.

FIG. 5*b* illustrates an alternative example of the control system for the right-of-way spray system according to the present invention.

FIG. 6 provides a front view of a control panel according to the first embodiment.

FIG. 7*a* is a perspective view of the right-of-way spray system according to a second embodiment.

FIG. 7*b* is a side view for the right-of-way spray system according to the second embodiment.

FIG. 7*c* shows a perspective view of a second registration plate utilized in the second embodiment.

FIG. 7*d* provides a front view of the registration plates including nozzles according to the second embodiment.

FIG. 7*e* provides a flow diagram illustrating the control scheme for the nozzles according to the second embodiment.

FIG. 7*f* provides a front view of the registration plates including nozzles and flow control units according to the second embodiment.

FIG. 8 shows an alternative registration plate having tabs oriented in varying directions according to an alternative embodiment.

FIG. 9 shows spray system wherein all of the flow control units are disposed on a single tier according to a second alternative embodiment.

FIG. 10 illustrates wind shear plates usable on virtually all embodiments of the invention.

FIG. 11*a* illustrates a vegetation engagement system including a spray system mounted to a vegetation engagement device according to a third embodiment.

FIG. 11*b* provides a diagram of the spray system according to the third embodiment.

FIG. 11*c* provides front view of the vegetation engagement system according to the third embodiment.

FIGS. 11*d*-11*f* illustrate alternative extensions of the third embodiment.

FIG. 11*g* provides a diagram of an alternative spray system according to an extension of third embodiment.

FIG. 11*h* provides a perspective view of the vegetation engagement system according to the extension of the third embodiment.

FIG. 12*a* is a side view for the right-of-way spray system including an electromagnet and an attractor according to a fourth embodiment.

FIG. 12*b* provides a perspective view of a spray arm disposed on the right-of-way spray unit according to the fourth embodiment.

FIG. 12*c* provides a perspective view of the attractor disposed on the spray unit according to the fourth embodiment.

FIG. 12*d* provides a perspective view of the spray arm and the attractor in an assembled position according to the fourth embodiment.

FIG. 12*e* provides a perspective view of the spray arm and the attractor after coating according to the fourth embodiment.

FIG. 12*f* provides a section view of the spray arm and the attractor in an assembled position according to the fourth embodiment.

FIG. 12*g* provides a perspective view of a vegetation engagement system according to the fourth embodiment.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

A spray system 100, according to a first embodiment of the present invention, includes a registration plate for positioning and restraining nozzles during a nutation event. The spray system 100 distributes and directs herbicide onto a roadside in a predetermined pattern through the use of a control system. The control system provides the capability to control the trajectory, nutation speed, as well as the flow of herbicide and herbicide components.

Figure 1A:
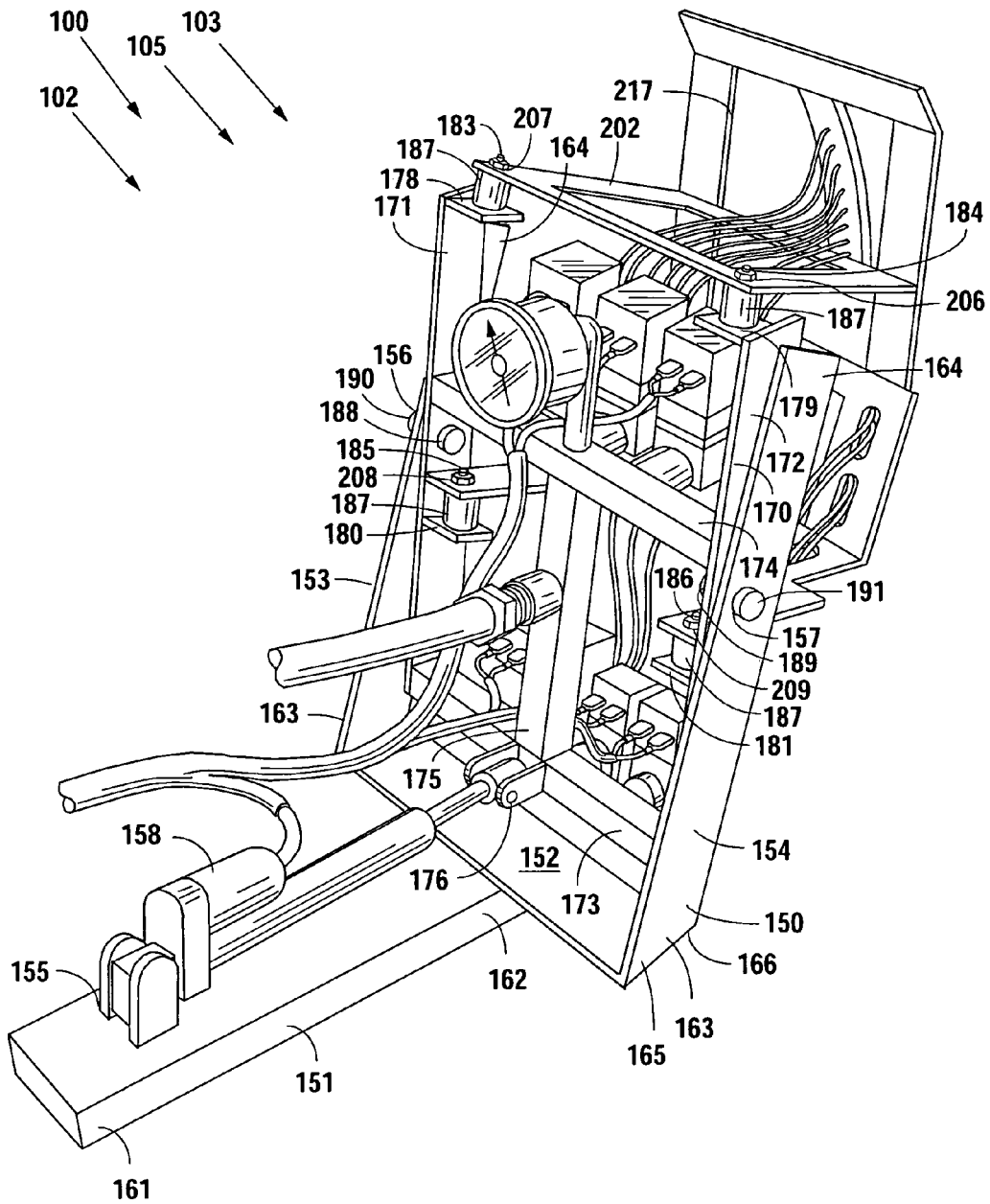

As shown in FIG. 1a, a spray system 100 includes a base frame 150, an inner frame 170, a spray head frame 202, a product circuit 102 a diluent circuit 103, and a control system 105. The outer frame 150 includes a base 151 having a first end 161 and a second end 162. The base 151 is of a steel plate construction, and is securable to virtually any form of structure. In this particular example, the base 151 is welded to a flat-bed of a pickup truck (not shown). However, one of ordinary skill in the art will recognize that the base 151 may be secured with fasteners, or the like. One of ordinary skill in the art will further recognize that the frame 150 may be secured to virtually any form of utility vehicle, including trucks, tractors, trailers, and the like, to deliver herbicide to a location adjacent to the utility vehicle.

The base frame 150 further includes a lateral support 152, first and second vertical supports 153-154, and a mounting point 155. The lateral support 152 is of a steel plate construction, and is welded to the second end 162 of the base 151, such that the lateral support 152 is substantially perpendicular to the base 151, the lateral support 152 is disposed on top of the base 151, and the base 151 is substantially centered along the lateral support 152. The first and second vertical members 153-154 are substantially identical in shape and form, and are planar. Both of the vertical supports 153-154 include a first end 163 and a second end 164. The first ends 163 include an acute corner 165, thereby creating an angled edge 166. In this particular embodiment, each angled edge 166 is welded to an end of the lateral support 152, such that the lateral support 152 and the first and second vertical members 153-154 form a U-shaped support, and the vertical members 153-154 extend away from the base 151. The first vertical member 153 further includes a first mounting aperture 156, and the second vertical member 154 includes a second mounting aperture 157.

A mounting point 155 is disposed on top of the base 151. In this particular example, the mounting point 155 is at least one tab including an aperture. While this mounting point 155 has been shown as a tab including an aperture, one of ordinary skill in the art will recognize that virtually any form of connection point may be utilized to connect the frame 150 to spray system 100 components.

The inner frame 170 includes first and second side members 171 and 172, respectively, first and second cross members 173 and 174, respectively, and a center support member 175. In this particular embodiment, the center support 175 is disposed between the first and second cross members 173 and 174, and the first and second cross members 173 - 174 are disposed between the first and second side members 171 and 172, thereby forming a rigid, substantially planar frame that is slightly smaller in width than an inner clearance of the first and second vertical members 153 and 154. In this particular example, the first and second cross members 173-174 and the center support 175 are formed from square tubing, such that an inner chamber of each square tube is fluidly connected to the others, and open ends are sealed off, thereby forming a manifold. One of ordinary skill in the art will recognize that the integral manifold is a weight-savings feature, and includes at least one inlet and at least one outlet.

Figure 2A:
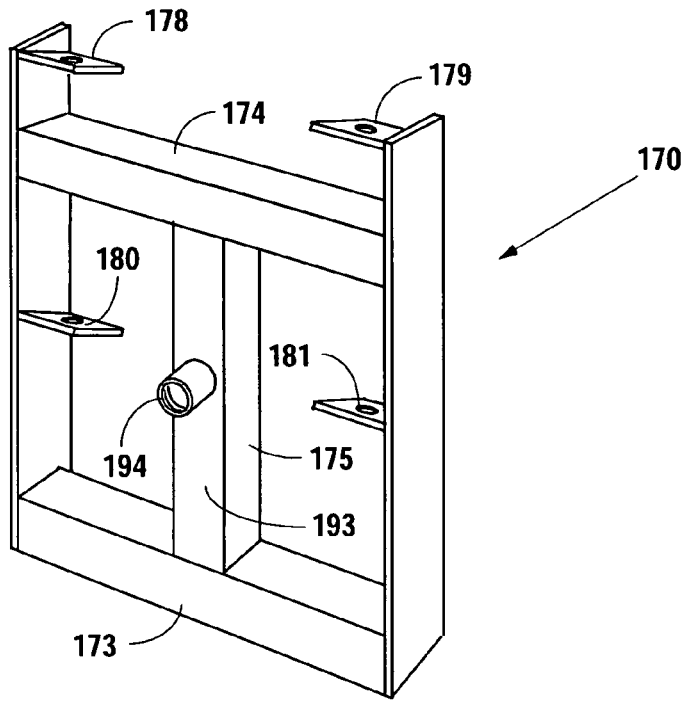
Figure 2B:
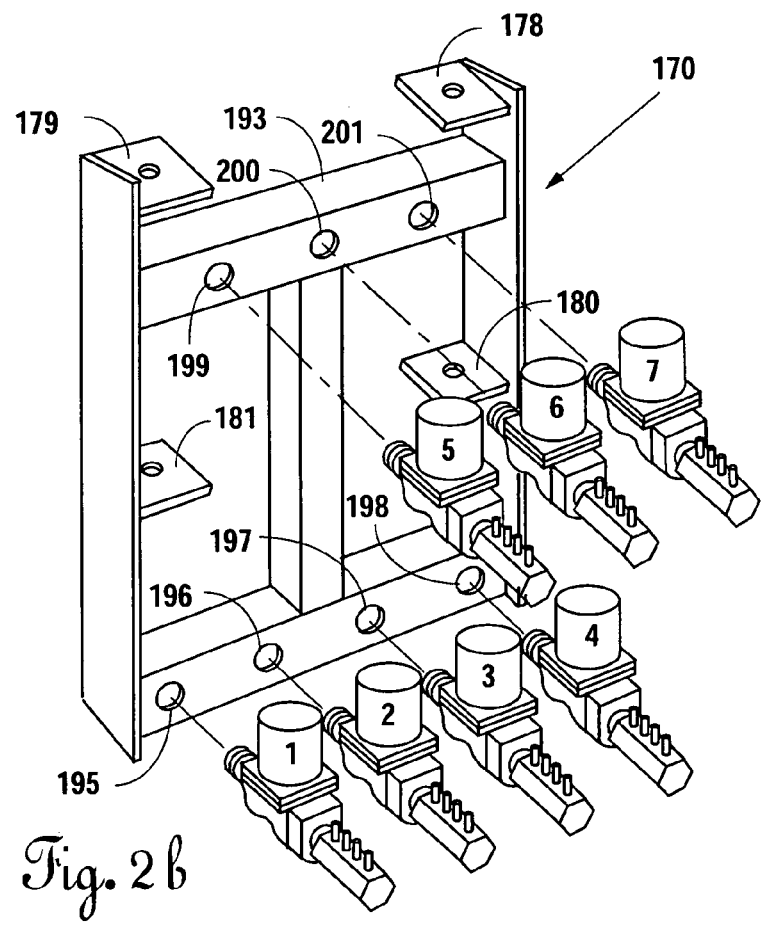
Figure 2C:
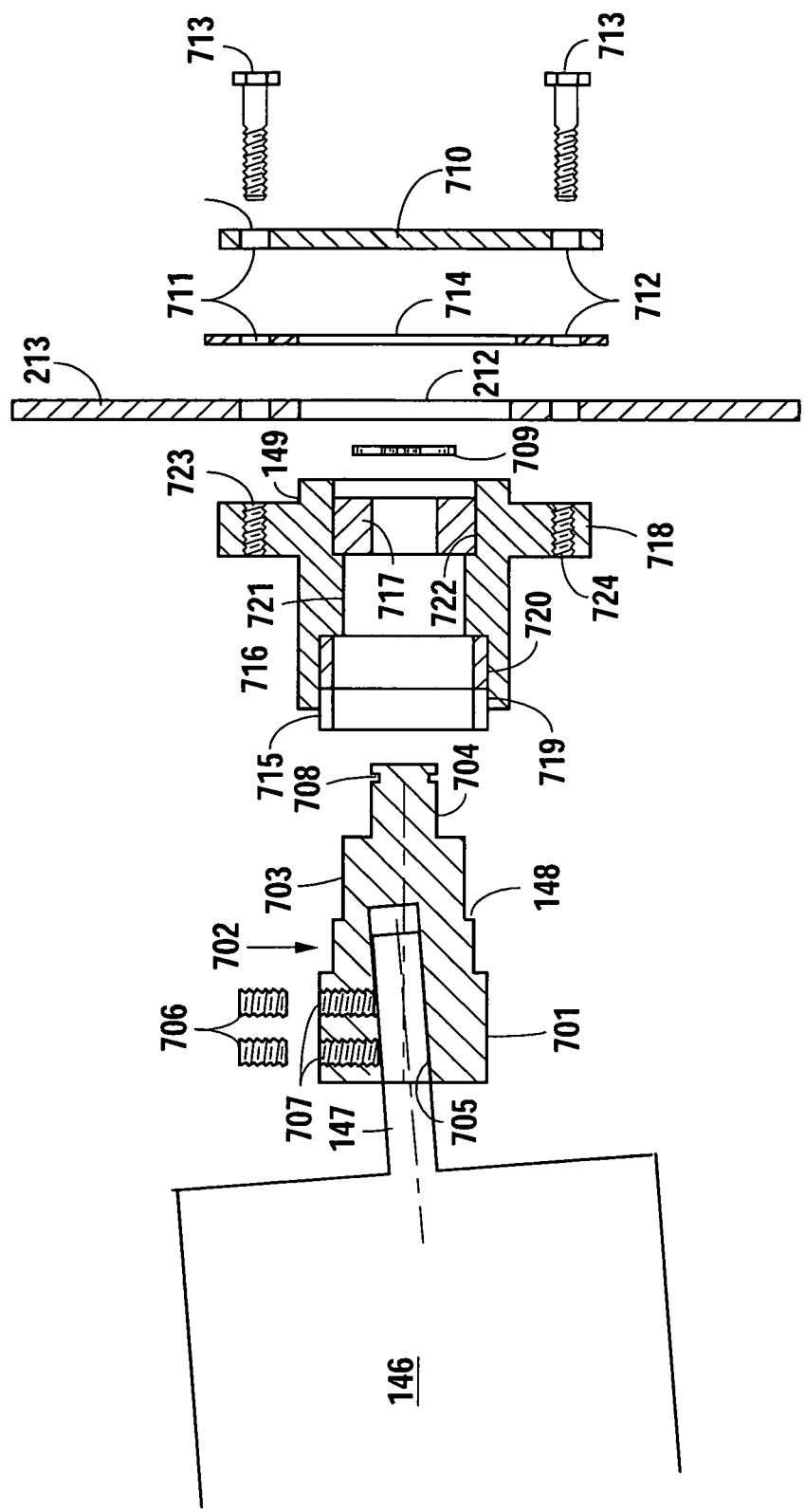
Figure 2D:
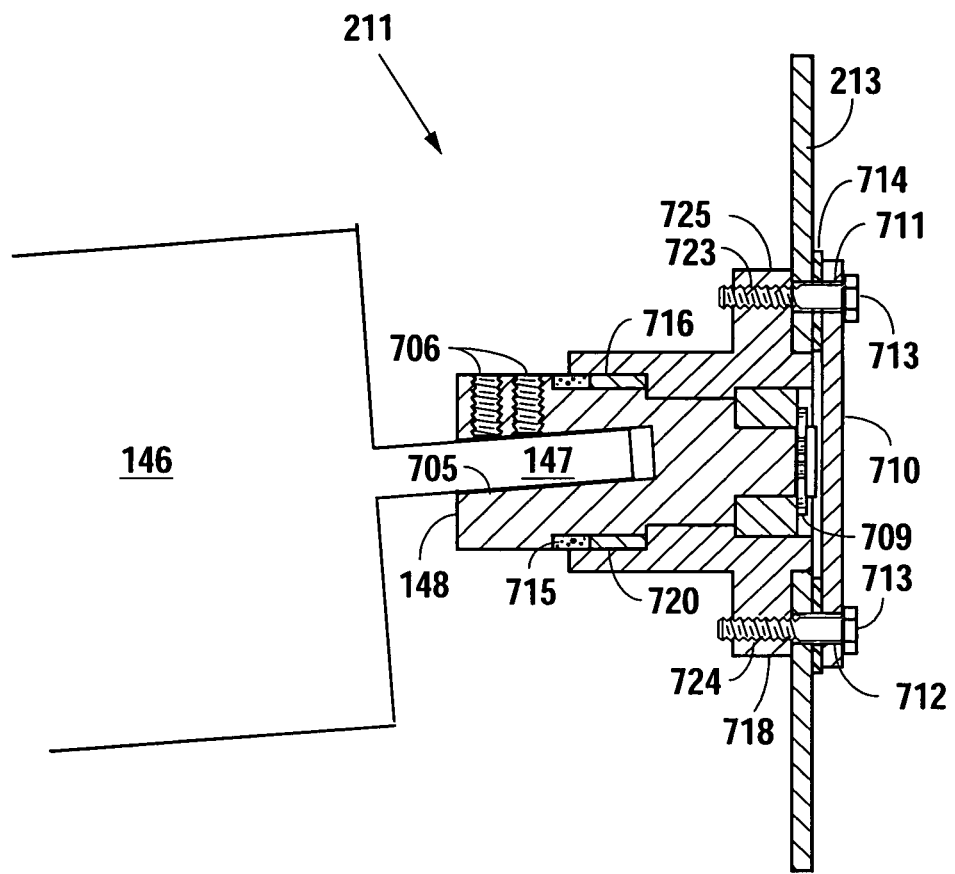

As shown in FIGS. 2a-2b, a manifold 193 is formed from members 173-175, and includes a manifold inlet 194 and first through seventh outlets 195-201, respectively. While this embodiment has been shown as a manifold that is integral to a frame, one of ordinary skill in the art will recognize that a separate manifold may be utilized.

The first and second side members 171 ad 172 extend beyond the second cross member 174, and further include first and second mounting tabs 178 and 179 extending toward the center support 175 at substantially ninety degrees to the side members 171 and 172. The inner frame 170 further includes third and fourth mounting tabs 180 and 181 disposed at a lower point on the side members 171 and 172. The first and second mounting tabs 178 and 179 are disposed at a same predetermined height, and are substantially co-planar. The third and fourth mounting tabs 180 and 181 are disposed at a same predetermined height, and are also co-planar to each other. Each mounting tab 178-181 includes a registration pin 183-186, respectively. The registration pins 183 -186 are disposed in a predetermined pattern, thereby creating two pairs of co-planar mounting points. The mounting points further include a vibration dampening media 187. In this particular example, the registration pins 183-186 are threaded and serve as the mounting points. The threaded studs pass through apertures in the mounting tabs 178-181, and support elastomeric bushings for vibration dampening. Accordingly, threaded nuts are threaded onto the threaded studs to secure the objects connecting to the mounting points. While the mounting points have been shown with threaded studs, threaded nuts, and elastomeric bushings, one of ordinary skill in the art will recognize that other forms of connection and vibration isolation are possible.

The inner frame 170 further includes a first pivot aperture 188 disposed within the first side member 171 and a second pivot aperture 189 disposed within the second side member 172. The first and second pivot apertures 188-189 are located at a height complementary to the first and second mounting apertures 156 and 157 of the outer frame 150, such that the inner frame 170 can pivot within the confines of the base frame 150 when pivot pins 190-191 are installed. In this particular example of the first embodiment, the pivot pins 190-191 are shoulder bolts. However, one of ordinary skill in the art will recognize that virtually any form of pins may be utilized to rotatably support the inner frame 170.

The inner frame 170 still further includes a mounting point 176 disposed on a side of the first cross member 173. The mounting point 176 is similar in construction to the mounting point 155 of the base 151, and includes at least one tab having an aperture and a restraining pin.

The spray system 100 further includes an actuator 158 securable to the mounting points 155 and 176. The actuator 158 is designed to extend and retract, thereby rotating the inner frame 170 about the first and second pivot pins 190 and 191. In this particular example, the actuator is an electric actuator, however, one of ordinary skill in the art will recognize that virtually any form of linear actuation may be utilized.

The spray head frame 202 includes a first support member 203, a second support member 204, and a motion inducer support plate 205. In this specific example of the spray head frame 202, the first and second support members 203 and 204 are of a sheet metal construction, and are rigidly secured to the motion inducer support plate 205 utilizing any suitable means, including welding or fasteners. One of ordinary skill in the art will recognize that all or part of the support plates 203-205 may be formed integrally, or separately and then secured together using fasteners, spot welding, or the like. In this particular example, the first support plate 203 includes apertures 206 and 207, at a spacing complementary to the registration pins 183 and 184 of the inner frame 170. In similar fashion, the second support 204 includes apertures 208 and 209, at a spacing complementary to the registration pins 185 and 186 of the inner frame 170. As such, the spray head frame 202 may be positioned on and supported from the restraint pins 183-186, and secured in position with fasteners.

In this particular example, the motion inducer support plate 205 includes a motion inducer mounting face 216, a pass-through face 217, and a connection face 218. The motion inducer mounting face 216 is disposed substantially perpendicular to the second support 204, and includes an aperture for receiving a shaft of a motion inducer 211, at least one aperture 219 for the passage of product lines, as well as apertures in a pattern complementary to a mounting pattern of the motion inducer 211. In this particular example, the motion inducer 211 is an electric motor, and is secured to the motion inducer support plate 205 with fasteners. The spray system 100 further includes a first registration plate 213 supported from the motion inducer 211, such that it will not rotate.

The motion inducer 211 is an apparatus that generates movement in the spray system 100 to force droplet separation. In this particular example, the motion inducer 211 is an electric motor 146 having a shaft 147, a cam 148 disposed on the shaft 147, and a cam housing 718 securable to the first registration plate 213. The cam 148 includes a shaft aperture 705, first through fourth shoulders 701-704, respectively, and restraint apertures 707 leading to the shaft aperture 705. The first through fourth shoulders 701-704 step down in size to accommodate assembly of the motion inducer 211. The restraint apertures 707 are threaded for receiving fasteners 706, thereby securing the motor shaft 147 in the shaft aperture 705. The shaft aperture 705 is disposed in the cam 148 at a slight angle, and is slightly offset from a centerline of the cam 148. Illustratively, the shaft aperture 705 is disposed in proximity to the range of two to five degrees. The first shoulder 701 engages an oil seal 715 on assembly, and the second shoulder 702 engages an inner race of a first bearing 716 disposed on the cam housing 718. The fourth shoulder engages an inner race of a second bearing 717 disposed on the cam housing 718. The cam 148 further includes a restraint groove 708 disposed near an end of the fourth shoulder 704 for receiving a retaining ring 709.

The cam housing 718 is cylindrical in shape, and includes an axial bore. The axial bore includes first through fourth inner diameters 719 through 722 of varying sizes to accommodate varying components. The first inner diameter 719 is complementary to an outer diameter of the oil seal 715, and the second inner diameter 720 is of a size complementary an outer race of the first bearing 716. The third inner diameter 721 is slightly larger than the third shoulder 703, such that a cavity is created between the third shoulder 703 and the third inner diameter 721 for holding a lubricating oil. The fourth inner diameter 722 is complementary in size to an outer race of the second bearing 717. The cam housing further includes a lobe 149 and a flange 725 housing first and second restraint apertures 723-724.

The motion inducer 211 still further includes a cover 710 and a gasket 714. The gasket is complementary in shape to the cover 710. The gasket 714 and the cover 710 include first and second apertures 711 and 712, whereby fasteners 713 pass through the first and second apertures 711 and 712, the first registration plate 212, and are secured to threads disposed within restraint apertures 723 and 724. As such, the cam housing 718 secures to the first registration plate 212.

On assembly, the oil seal 715 is placed into the first inner diameter of the cam housing 718, and the cam 148 is secured to the shaft 147. Next, the cam 148 is inserted into the axial bore of the cam housing 718 such that the second shoulder 702 aligns with the first bearing 716 and the fourth shoulder 704 aligns with second bearing 717. In this configuration, the end of the restraint groove 708 is disposed in proximity to the lobe 149, and the retaining ring 709 is placed into the restraint groove 708.

Next, the lobe 149 is placed into the aperture 212 of the registration plate 213, and the gasket 714, cover 710 and cam housing 718 are secured to the registration plate 213. At this point, the cam housing 718 is filled with lubricant. Upon assembly, the shaft 147 and the cam 148 rotate within the cam housing 718 when the motor 146 is powered.

Figure 2E:
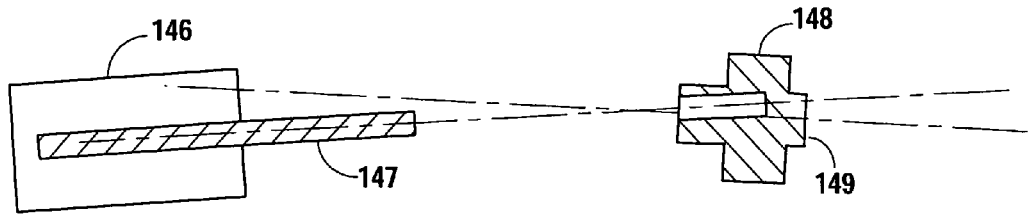
Figure 2F:
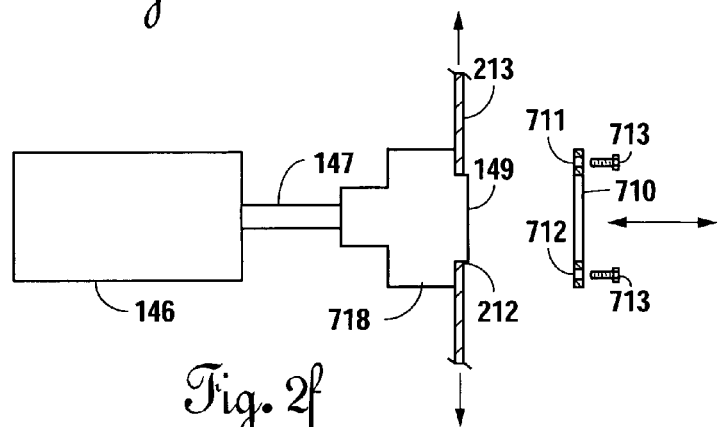

As shown in FIG. 2e, an axis of the shaft 147 is not collinear with an axis of the cam 148, and, the centerline of the shaft 147 is offset from the centerline of the cam, and, therefore, the cam 148 generates motion in multiple planes when the motor 146 is powered. Accordingly, operation of the cam 148 and the offset shaft 147 delivers force components in multiple planes, as shown in FIG. 2f.

Figure 2G:
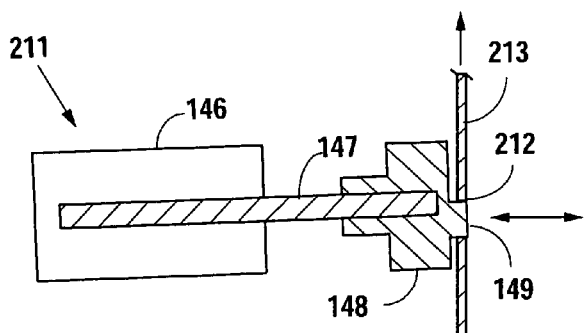

While this embodiment has been shown with a cam disposed at a slight angle to the shaft, one of ordinary skill in the art will recognize that other forms of angled engagement are possible, including a motor having a cam disposed perpendicularly on a shaft, wherein the motor and shaft are disposed at a slight angle to the engaging object to create force components in multiple planes, as show in FIG. 2g.

Figure 2H:
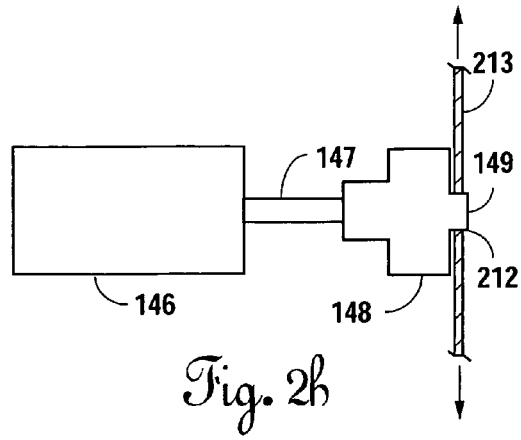

While this embodiment has been shown with a motion inducer 211 delivering a nutating motion, one of ordinary skill in the art will recognize that motion in a single plane is possible by utilizing a motion inducer that delivers force components along a single force plane, as shown in FIG. 2h. One of ordinary skill in the art will recognize that a vibration may be achieved by utilizing a cam 148 with a lobe 149, wherein an axis of the cam 148 is collinear with an axis of a motor shaft 147, and the cam 149 is disposed perpendicularly to an engaging object.

While this embodiment has been shown with an offset shaft 147 and an angled relationship between the shaft 147 and the cam 148 utilized in combination, one of ordinary skill in the art will recognize that either will deliver a nutating motion, and may be utilized separately to generate the nutating motion described herein.

Accordingly, in this first embodiment, the first registration plate 213 nutates when the motion inducer 211 is powered. While this particular embodiment has been shown with an electric motor and a cam disposed at an angle, one of ordinary skill in the art will recognize that virtually any form of nutation inducer may be utilized to create the nutation of the first registration plate 213. One of ordinary skill in the art will further recognize that a motion event may include nutation or vibration motion, or a combination thereof.

The first registration plate 213 includes a primary face 257 and a secondary face 258 disposed at an angle of approximately thirty degrees. In this particular example, the first registration plate 213 is a single component, and, therefore, the secondary face 258 may be construed as a tab that is integrally formed with the primary face 257, thereby eliminating the possibility of registration plate components loosening during a vibratory event. The primary face 257 and the secondary face 258 include apertures 221-236 for receiving spray nozzles. The apertures 231-236 are disposed in a predetermined pattern to effect a desired spray content. Specifically, the first registration plate 213 may be formed from a sheet metal gage suitable to maintain its shape during all motion events, including nutation and vibration. While the first registration plate 213 is rigid, it is of a reduced size to minimize weight, as well as the loads applied to the motion inducer 211. Illustratively, the apertures 221-222 and 227-236 are disposed along the edges of the primary face 257, and in a linear pattern along the secondary face 258. Accordingly, nozzles disposed within the apertures 223-226 are angled to deliver a spray pattern in proximity to the device.

The pass through face 217 is substantially planar, and includes at least one pass-through to allow the passage of product lines. In this particular example, the pass through face 217 is disposed approximately thirty degrees from the motion inducer mounting face 216, and extends upward, thereby providing support for a second bank. In this particular example, the connection face 218 is disposed at an angle of approximately thirty degrees relative to the pass through face 217, and includes a means for restraining a second registration plate 214. In this specific example, the second registration plate 214 is a rigid, curved plate that provides a nozzle registration pattern through the use of apertures at a predetermined spacing. The second registration plate 214 if formed from sheet metal or plate, and extends toward the first registration plate 213. The curved second registration plate 214 further includes seventeenth through twenty-fifth apertures 237-245 disposed in a single vertical line along the curved second registration plate 214. The apertures 237-245 are of a diameter complementary to nozzles to be described later. The second registration plate 214 further includes at least one mounting aperture 246 for attachment and restraint. In similar fashion to the first registration plate 213, the second registration plate 214 is of a gage suitable to maintain its shape during a motion event, thereby maintaining the desired spray pattern.

Figure 3A:
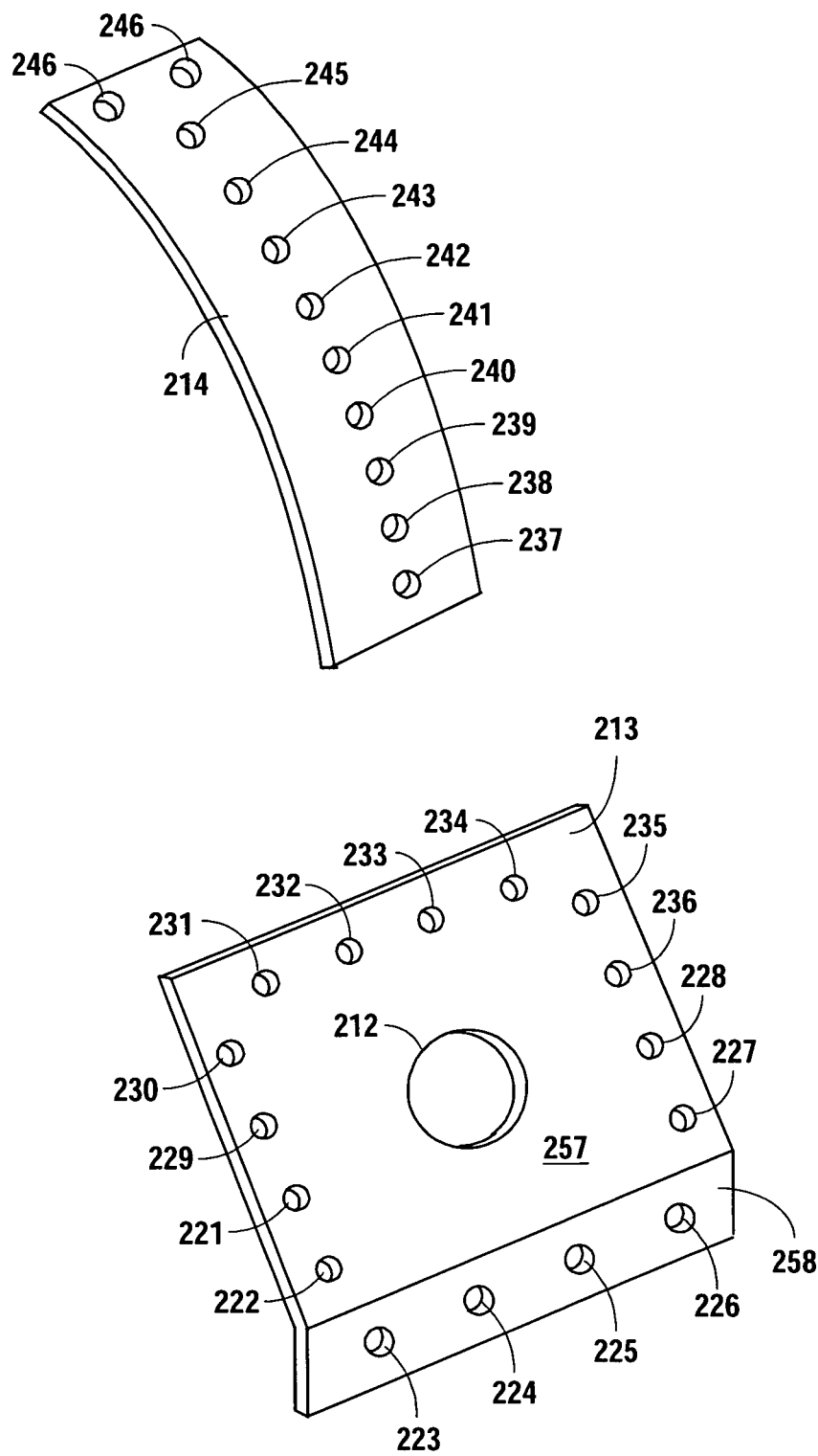
Figure 3B:
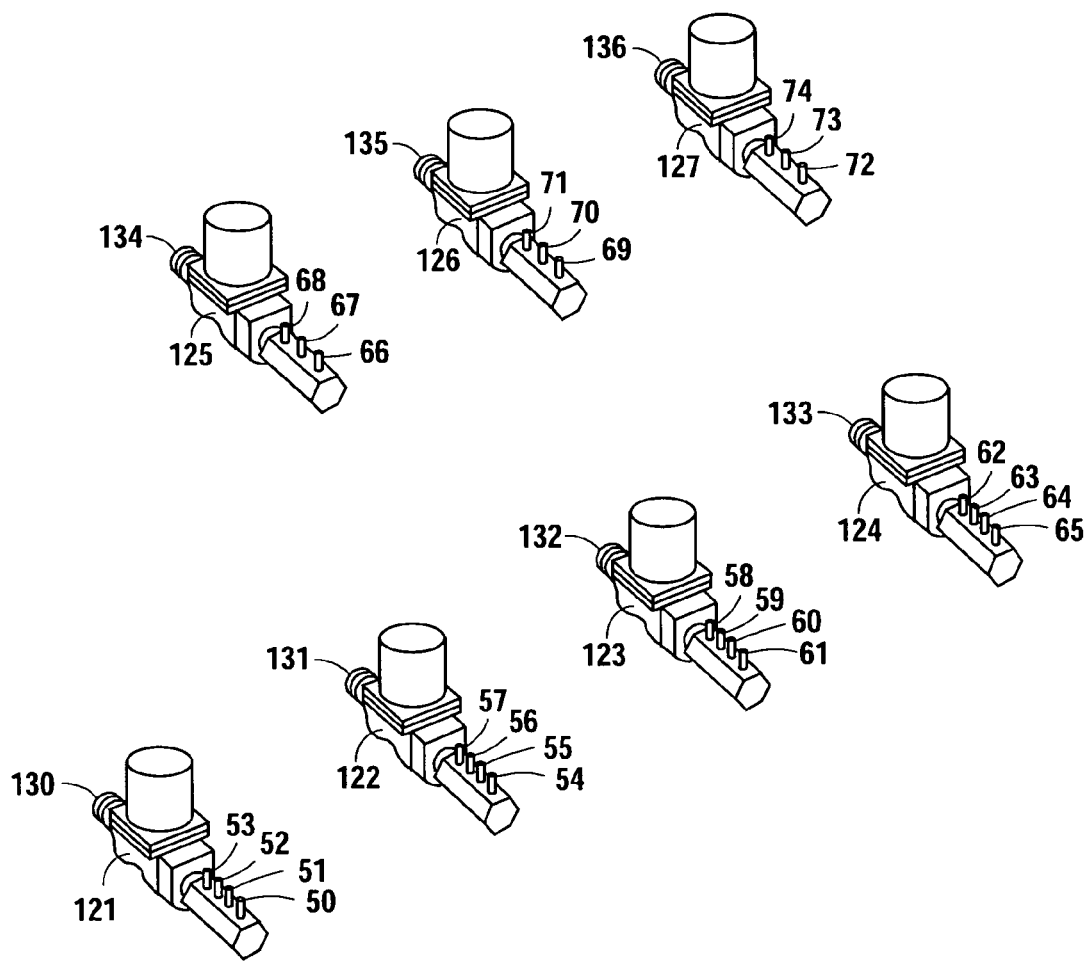
Figure 4:
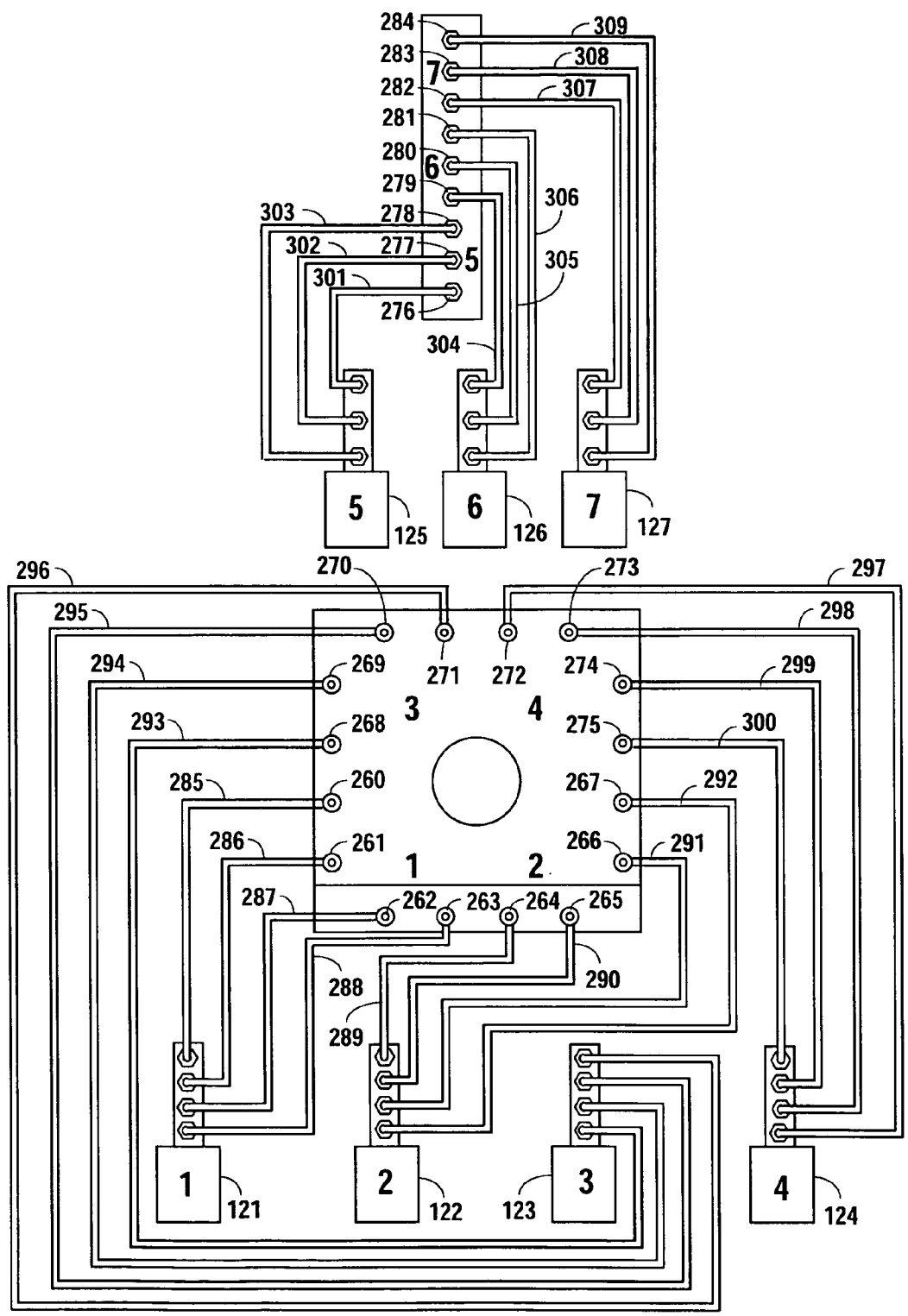

As shown in FIG. 3b, the first through seventh flow control units 121-127 include a valve, a valve actuator, and a manifold connected to an outlet of the valve. In this particular example, the flow valves are solenoid activated. The first through fourth flow control units 121-124 are supported by the inner frame 170, and include one inlet port and four outlet ports each. The first through fourth flow control units 121-124 include first through fourth inlets 130-133, and outlets 50-65, respectively. The inlets 130-133 of the first through fourth flow control units 121-124 are connected to the first through fourth manifold outlets 195-198, respectively, and, therefore, are exposed to any fluid pressure in the manifold 193. The fifth through seventh flow control units 125-127 are disposed on a higher tier of the inner frame 170, and include inlet ports 134-136, respectively, and three outlet ports each, 66-74, respectively. The inlets 134-136 of the fifth through seventh flow control units are connected to the fifth through seventh manifold outlets 199-201, respectively.

As shown in FIG. 4, the spray system 100 further includes first through twenty-fifth nozzles 260-284, respectively, disposed in the first through twenty-fifth apertures 221-245, respectively. The nozzles 260-284 are rigidly secured into their respective apertures 221-245 to eliminate the possibility of the nozzles 260-284 vibrating free during the motion event. Illustratively, the nozzles 260-284 include a shoulder that mates with the registration plate and a threaded portion that passes through the respective aperture, and a fastener including threads complementary to the threads of the threaded nozzle, wherein the fastener is disposed on the side opposite of the shoulder, thereby restraining the nozzle in the respective aperture. One of ordinary skill in the art will recognize that additional locking mechanisms may be employed to permanently secure the nozzles 260-284 in their respective apertures, including lockwashers, wiring of the nuts, threads locking compounds, and the like. As such, the nozzles 260-284 are permanently secured in their respective apertures. The nozzles 260-284 are routine in the art, and are utilized to deliver a fluid spray. The nozzles 260-284 may have adjustable tips that allow a user to adjust a spray stream by moving a nozzle cone relationship. The spray system 100 further includes first through twenty-fifth nozzle tubes 285-309 that are fluidly connected to the first through twenty fifth nozzles 260-284, respectively. The inlets of the nozzle tubes 285-309 are also connected to outlets 50-74 of the first through seventh flow control units 121-127, as shown in FIG. 4.

Still further, the outlets 50-74 of the manifolds of the flow control units 121-127 are disposed in an upward direction to reduce the amount of fluid moving toward a nozzle after a flow control unit is shut off. The flow control units 121-127 are disposed in close proximity to the nozzles to reduce a residual hose length (hoses located beyond the flow control units) in the spray system 100. The spray system further includes a reduced hose diameter to further decrease the amount of product disposed within the residual hose length. This feature, in combination with the upward facing manifold outlets 50-74 of the flow control units 121-127, reduces the amount of residual product remaining within the product lines after a shut-off, thereby minimizing the possibility of residual drainage after shut-off.

Illustratively, the first flow control unit 121 is coupled to the first through fourth nozzles 260-263, the second flow control unit 122 is fluidly connected to the fifth through eighth nozzles 264-267, the third fluid control unit 123 is connected to the ninth through twelfth nozzles 268-271, and the fourth flow control unit 124 is in fluidly connected to the thirteenth through sixteenth nozzles 272-275. In similar fashion, the fifth flow control unit 125 is fluidly connected to the seventeenth through nineteenth nozzles 276-278, the sixth flow control unit 126 is fluidly connected to the twentieth through twenty-second nozzles 279-281, and the seventh flow control unit 127 is in fluid communication with the twenty-third through twenty-fifth nozzles 282-284. As such, each flow control unit regulates the passage of fluid through the nozzles fluidly connected to it. Illustratively, fluid flows through the flow control unit when the flow control unit is in an on position, and the flow of fluid is halted at the flow control unit when the flow control unit is in an off position. In this particular example, the first through seventh flow control units 121-127 create first through seventh swaths. The swaths are disposed laterally adjacent or vertically adjacent to each other to create a desired spray pattern. One of ordinary skill in the art will recognize that a swath may include spray from a single nozzle in combination with a single flow control unit, or may include spray from multiple nozzles controlled by a single flow control unit or multiple flow control units. Accordingly, a variety of flow control units and nozzle combinations may be utilized to create a same swath or spray pattern.

While this embodiment has been shown with a solenoid actuated flow control unit, one of ordinary skill in the art will recognize that other forms of valve actuation are possible, including manual actuation of valves.

The control system 105 includes a controller 106 in electrical communication with flow control components, including a pump 107, at least one product pumping device 108, first through seventh flow control units 121-127, a flow meter 112, a ground speed sensor 111, and the like. The flow meter 112 is well known in the art of flow controls, and delivers flow information to the controller 106. The ground speed sensor 111 provides signals to the controller 106 indicative of vehicle speed, to aid in product delivery.

Figure 5A:
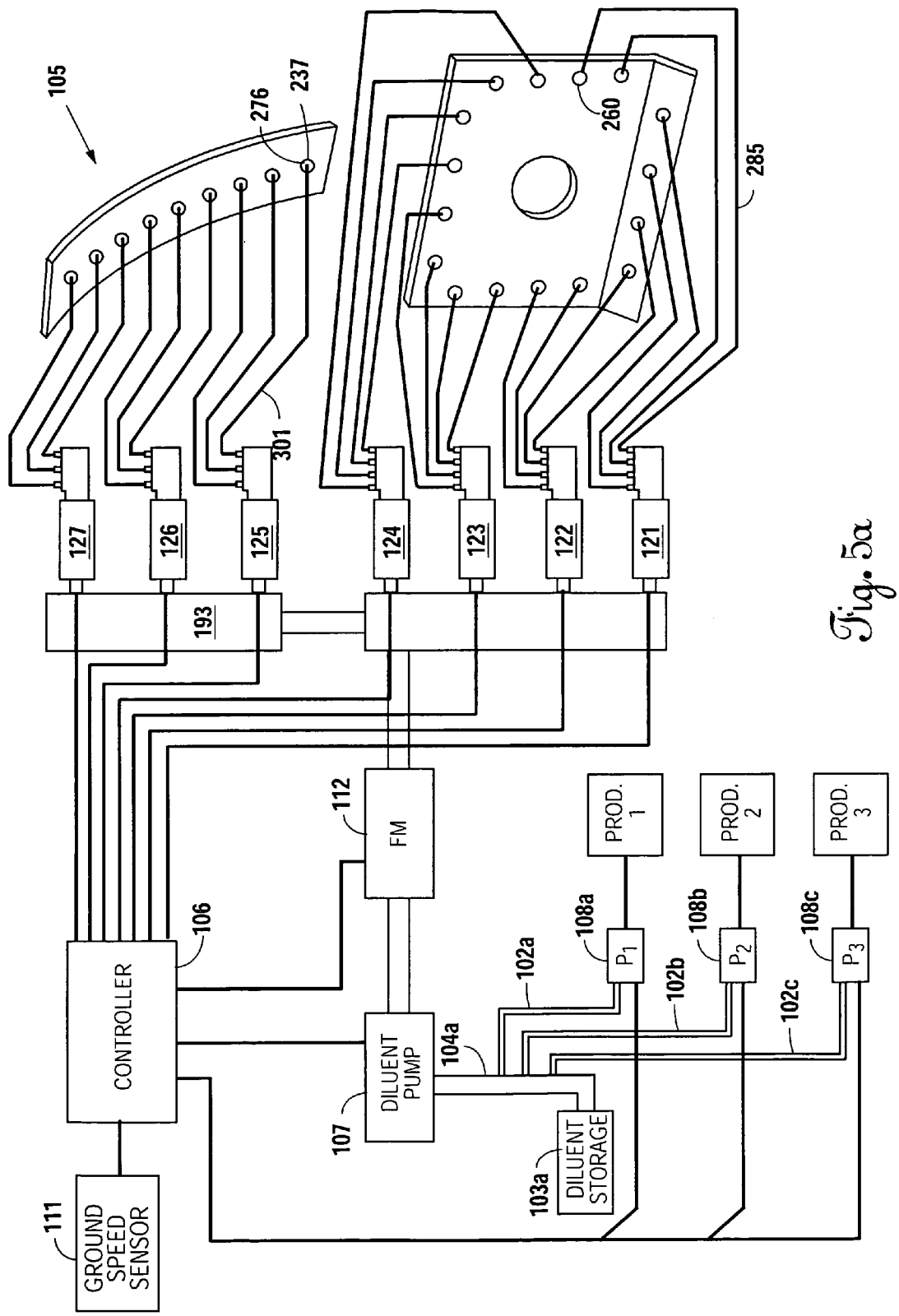

A product circuit 102a commences at a remote product source (shown), and includes the at least one product pumping device 108. The product circuit 102a further includes at least one product line that extends from a discharge port of the at least one product pumping device 108 and into the diluent pump 107. In this particular example, the at least one product pumping device 108 is a peristaltic pump, however, one of ordinary skill in the art will recognize that virtually any form of pump may be utilized, provided that it is compatible with the chemicals being pumped. One of ordinary skill in the art will further recognize that it is possible to provide multiple remote product sources delivering product at a predetermined rate to create a mixture of chemicals. As shown in FIG. 5a, this particular example delivers product from three product sources through the use of three peristaltic pumps 108a-108c, each of which delivers to an independent product line 102a, 102b, or 102c, respectively.

A diluent circuit 103a commences at a remote diluent source, and continues through a diluent line that feeds into an inlet of the diluent pump 107, wherein a diluent is mixed with the product moving out of the pumps 108a-108c.

A mixed product circuit 104a commences at the inlet of the diluent pump 107 and extends into the manifold 193 housing the flow control units 121-127. The pump 107 pressurizes the mixture, thereby moving the mixture to the flow control units 121-127. The mixed product circuit 104a further includes manifolds at the exit end of the flow control units 121-127 that are connected to inlets of nozzle tubes 285-309. The nozzle tubes 285-309 pass through the motion inducer support plate 205 and connect to nozzles 260-284 disposed within the apertures 221-245 of the registration plates 213-214.

Illustratively, the first flow control unit 121 includes an outlet port 50 connected to an inlet of a first nozzle tube 285, and an outlet of the first nozzle tube 285 is connected to the first nozzle 260 that is disposed within a first nozzle aperture 221 of the first registration plate 213. In this particular example, the first nozzle 260 includes threads on at least a portion of an outer surface, and is secured to the first registration plate 213 with a nut disposed on an opposite side of the first registration plate 213, thereby rigidly securing the first nozzle 260 in the first nozzle aperture 221. While the first nozzle 260 has been shown with threads and a securing nut, one of ordinary skill in the art will recognize that other means for securing the nozzle 260 to the registration plates 213-214 may be utilized, such as e-clips, pins, threaded apertures, and the like.

In similar fashion, the fifth flow control unit 125 includes an outlet port 66 connected to an inlet of the seventeenth nozzle tube 301, and an outlet of the seventeenth nozzle tube 301 is connected to the seventeenth nozzle 276 disposed within the seventeenth nozzle aperture 237 of the second registration plate 214. Accordingly, the first nozzle 260 and the seventeenth nozzle 276 deliver mixed product at different heights. Based on the placement of the nozzles, the direction of spray delivery may be altered. Ordinary skill in the art will recognize that the additional flow control units provide the capability to cease or commence the flow of the fluid in a swath, a swath portion, a predetermined pattern, distance, or direction. In similar fashion, the fifth flow control unit 125 may deliver fluid to the seventeenth through nineteenth nozzle tubes 301-303 and the seventeenth through nineteenth nozzles 276-278. Accordingly, mixed product is delivered to nozzles in both the first and second registration plates 213-214 if the respective flow control units are in an open position.

The additional flow control units in combination with nozzle tube and nozzles deliver mixed product to nozzles disposed in both registration plates 213-214. After buildup, the motion inducer 211 supports the cam, the first registration plate 213, the cover, the bearings, the nozzles, and the nozzle tubes. One of ordinary skill in the art will recognize that the new scheme provides a weight-reduction for the motion inducer 211, and, therefore, prolongs motor and bearing life. One of ordinary skill in the art will further recognize that a particular registration plate may include additional flow control units, nozzles, and nozzle tubes to provide increased delivery capability.

The control system 105 may be operated in two modes, a passive mode wherein the operator has no intervention, and an active mode wherein the operator is able to manually adjust various settings, such as nutation speed, flow, sprayer height, chemical selection, and the flow of product to each nozzle.

Upon powering the spray system 100 in the passive mode, the control system 105 opens the flow control units 121-127 for a predetermined pattern. Illustratively, the control system 105 may activate the pump 107 and open all of the nozzles 260-284 currently fluidly connected to the pump 107. The control system 105 also delivers power to the motion inducer 211, and monitors the flow meter 112, the width of the spray swaths, the ground speed radar 111, and the rate of product selected per acre to determine if adequate product is flowing from the chemical injection pumps 108 for the current speed of the vehicle. If the flow of concentrated product is below a threshold for the current speed, the controller 106 increases the speed of the pumps 108a- 1 08c to get the desired amount of chemical to the spray swaths. If the flow of concentrated product is greater than that required for the current vehicle speed, the controller 106 decreases the speed of the pumps 108a-108c, thereby reducing the flow of the concentrated product and ensuring that proper amounts of concentrated products are being delivered for a current speed of the spray vehicle and swath width.

As the mixture is sprayed, the motion inducer 211 is energized by a power source. In this embodiment of the invention, the motion inducer 211 is an electric motor in combination with a cam, whereby the motor shaft is slightly offset from the center of the cam and disposed at a slight angle into the cam. This ensures that the cam 148 delivers force components in multiple planes to the first registration plate 213 and, to a lesser extent, due to internal damping of the structure, a vibration in the second registration plate 214. The nutation, accordingly, causes nozzles 260-275 and 276-284 to nutate or vibrate with their respective registration plate 213 or 214, and break up the mixed product projecting from nozzles 260-275 into droplets.

During the nutation event, the first registration plate 213 maintains shape and resonates at a desired nutation frequency, and the nozzles 260-275 remain rigidly fixed, and, therefore, nutate with the first registration plate 213. Similarly, the second registration plate 214 maintains shape and experiences transferred vibration from the nutation of the first registration plate 213. The nozzles 276-284, accordingly, move with the second registration plate 214. As such, a concise and consistent spray pattern is created, and movement of the spray vehicle creates a predetermined swath, thereby ensuring proper herbicide dosage and delivery. Areas disposed further from the vehicle are sprayed with increasing droplet sizes to minimize atomization and to reach greater distances. The nozzles covering swaths further from the vehicle may also have larger orifice openings than those covering swaths closer to the vehicle, which also enables control of the droplet sizes. The preferred swaths are nozzles that are grouped together to create swaths that are laterally adjacent or vertically adjacent to each other. While this embodiment has been shown with an electric motor having a cam, one of ordinary skill in the art will recognize that other forms of nutation inducers may be utilized to generate a nutating motion. One of ordinary skill in the art will further recognize that different speeds of the electric motor create varying resonance frequencies.

Figure 6:
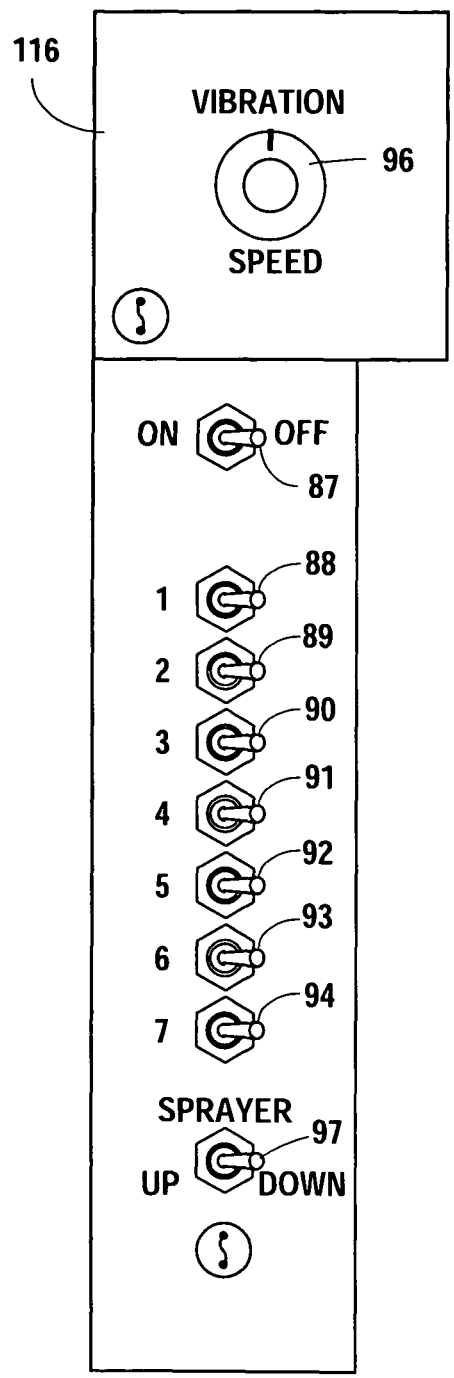

In the active mode, the spray system 100 further includes a flow switch panel 116 controlled by an operator. As shown in FIG. 6, the flow switch panel 116 includes first through seventh nozzle switches 88-94, a power switch 87, an elevation control switch 97, and a vibration speed adjustment knob 96. The power switch 87 provides a means for the operator to supply power to the spray system 100, and the switch 97 allows the operator to adjust the elevation of the spray head by pressurizing or depressurizing the actuator 158. The vibration speed adjustment knob 96 allows the operator to increase or decrease the speed of the electric motor, thereby adjusting the resonant frequency of the induced nutation. Nozzle activation switches 88 through 94 allow the operator to independently open or close the individual flow control units 121-127. Illustratively, moving nozzle activation switch 88 to an on position opens the first flow control unit 121, thereby allowing the mixed product to flow to, and be expelled from, the first through fourth nozzles 260-263. One of ordinary skill in the art will recognize that each of the remaining nozzle activation switches is similarly connected to the remaining flow control units, and the remaining flow control units 122-127 may be opened by the operator when a respective nozzle activation switch 89-94 is activated.

While this example has been shown with flow meters, one of ordinary skill in the art will recognize that the control system 105 may be utilized without flow meters by allowing the pumps 108a-108c to regulate the delivery of the concentrated products. One of ordinary skill in the art will further recognize that the controller is able to monitor and control the revolutions per minute of any or all product pumps.

Figure 5B:
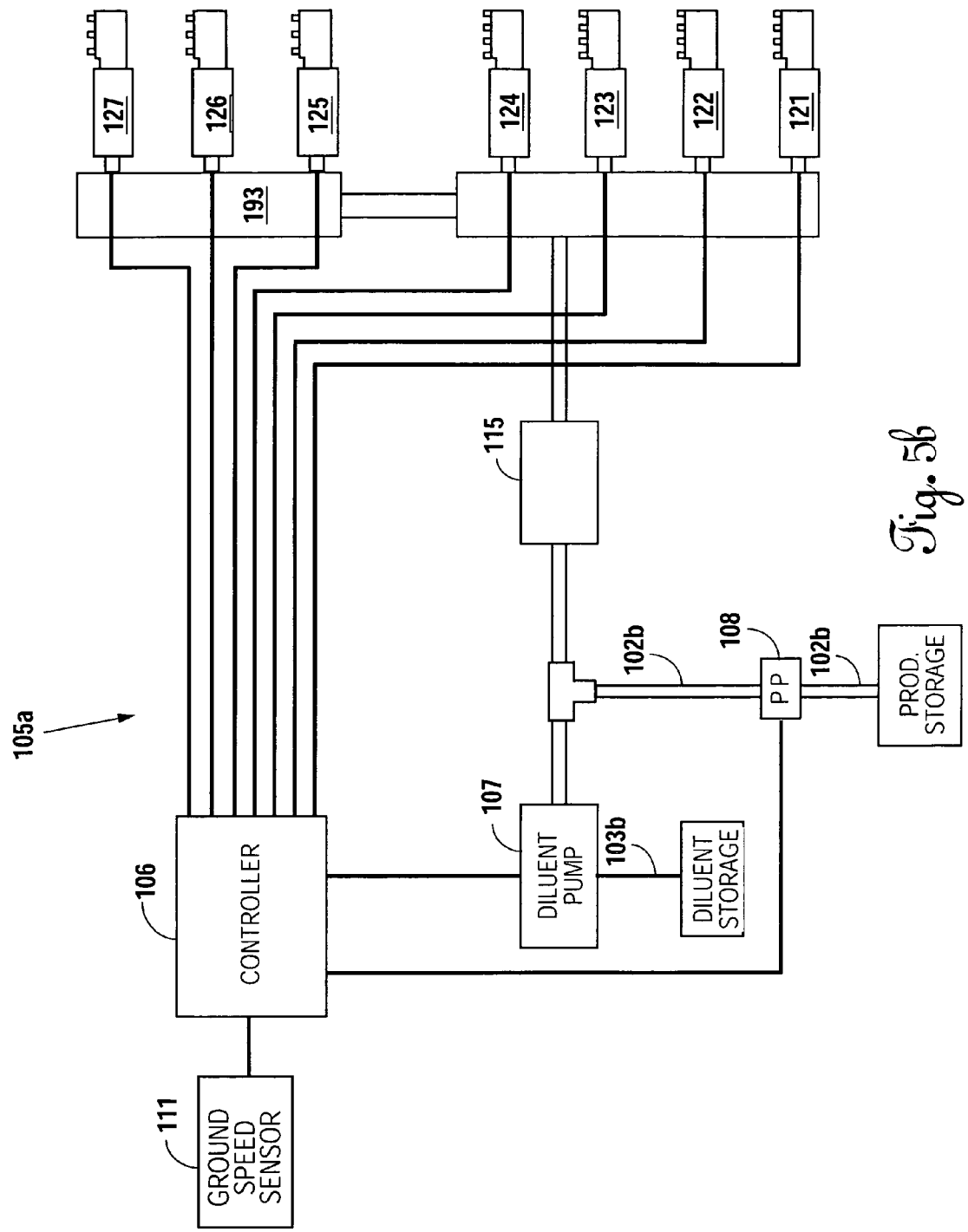

In an alternative example, the spray system 100 could include a product circuit that is injected into a high-pressure side of the system, in lieu of a product circuit having a pump that injects product into an inlet of the diluent pump 107 disposed on a low-pressure side of the spray system. As shown in FIG. 5b, a control system 105a includes a controller 106 in electrical communication with flow control components, including a pump 107, at least one product pumping device 108, first through seventh flow control units 121-127, an in-line mixer 115, a ground speed sensor 111, and the like. The ground speed sensor 111 provides signals to the controller 108 indicative of vehicle speed, to aid in product delivery.

A product circuit 102b commences at a remote product source (shown), and includes the at least one product pumping device 108. The product circuit 102b further includes a product line connected to a discharge port of the at least one product pumping device 108. In this particular example, the product line extends to an inlet of the in-line mixer 115. In this particular example, the at least one product pumping device 108 is a piston pump, however, one of ordinary skill in the art will recognize that virtually any form of pump may be utilized, provided that the pump is usable in the pressure range of a pressure line, and is compatible with the chemicals being pumped.

A diluent circuit 103b commences at a remote diluent source, and moves into an inlet of the pump 107. After pressurizing in the pump 107, the diluent circuit 103b extends into the in-line mixer 115.

A mixed product circuit 104b commences at a mixing chamber of the in-line mixer 115, and extends to the flow meter 112, and to the flow control units 121-127. The pump 107 pressurizes the mixture, thereby moving the mixture to the flow control units 121-127. The mixed product circuit 104b further includes a manifold 193, flow control units 121-127 that include manifolds having outlets 50-74 that are connected to inlets of nozzle tubes 285-309. The nozzle tubes 285-309 pass through the nutation inducer support plate 205 and connect to nozzles 260-284 disposed within the apertures 221-245 of the registration plates 213-214.

Operation of the control system 105*a* of the alternative example is identical to the operation of the control system 105 of the spray system 100, and, therefore, will not be further described.

While the previous embodiments have been shown utilizing flowmeters, one of ordinary skill in the art will recognize that different flow control schemes may be utilized to control the flow of the fluids disposed within the spray system. Illustratively, portion control pumps may be utilized to deliver measured quantities of either product or diluent. Accordingly, the control systems of the spray systems of the previous embodiment may be adapted to utilize alternative components, and should be construed as part of this invention. One of ordinary skill in the art will further recognize that the controller is able to monitor and control the revolutions per minute of any or all product pumps.

In a second example including a different delivery pattern, a spray system 320 includes a base frame 150 and inner frame 170 having upper registration pins 183-184 and lower registration pins 185-186 that align with and attach to a spray head frame that houses a first registration plate 331 and a second registration plate 330, as described in the first embodiment. In this particular example, the spray system 320 includes a spray head support frame 325, preferably constructed from sheet metal components. Illustratively, the spray head support frame 325 includes a first support member 326, a second support member 327, and a third support member 328. The first support member 326 is substantially planar, and includes mounting apertures 311 for receiving the mounting pins 183-184 disposed on the inner frame 170. The first support member 326 further includes a second set of mounting apertures 312 for securing the second support member 327, and a third set of mounting apertures 313 for adapting to the second registration plate 330. The first support member 326 extends from the inner frame 170 at an angle of approximately sixty degrees, and terminates at an upper registration plate 330. The second support member 327 is substantially planar, and includes two flanges 332-333 disposed at an angle of approximately thirty degrees. The flanges 332-333 include apertures 314 for receiving fasteners passing through the second set of mounting apertures 312 of the first support member 326, thereby separating the planar portion of the second support member 327 from the first support member 326 when the fasteners are secured. In similar fashion to the first embodiment, the second registration plate 330 is monolithic to eliminate the possibility of multiple registration plate components separating during a vibratory event. In this particular example, the second registration plate 330 is formed from a sheet metal gage suitable to maintain its shape during a motion event, thereby delivering a consistent spray pattern. The second registration plate 330 includes a planar primary face 334, a first flange 335, and a second flange 336. The first flange 335 is disposed substantially perpendicular to the primary face 334, and includes mounting apertures 337 disposed at either end to accept fasteners passing through the third set of mounting apertures 313 of the second support member 327 and the mounting apertures 337, thereby securing the second registration plate 330 substantially perpendicular to the second support member 327.

The third support member 328 includes a planar first face 339 and a motion inducer mounting face 340 disposed substantially perpendicular to the first face 339. The first face 339 includes a pair of mounting apertures 341 disposed in alignment with the mounting pins 185-186 of the inner frame 170. The motion inducer mounting face 340 further includes mounting apertures 342 for receiving fasteners that pass through the mounting apertures 338 of the second flange 336 of the registration plate 330. As such, the second registration plate 330 and the motion inducer mounting face 340 are permanently secured to each other in substantially a thirty-degree relationship. The motion inducer mounting face 340 further includes a shaft relief for receiving a shaft of a motion inducer 343, as described in the first embodiment. Illustratively, the motion inducer mounting face 340 includes a hole pattern that is complementary to a bolt pattern of the motion inducer 343. In this second embodiment, the motion inducer 343 delivers a nutation motion, as described in the first embodiment.

The first registration plate 331 includes integral tabs having at least one aperture. The tabs are integral to eliminate the possibility of separate tabs loosening during the nutation event. As shown in FIGS. 7a-7d, the first registration plate 331 includes a primary face 342 that is planar, and includes first through sixteenth tabs 345-360 that include first through sixteenth apertures 371-386, respectively. The apertures 371-386 are of a size complementary to nozzles, as described in the first embodiment.

In similar fashion, the second registration plate 330 includes seventeenth through twenty-sixth tabs 361-370 that include seventeenth through twenty-fifth apertures 387-395. Likewise, the apertures 387-395 are of a size complementary to the nozzles described in the first embodiment.

Figure 7A:
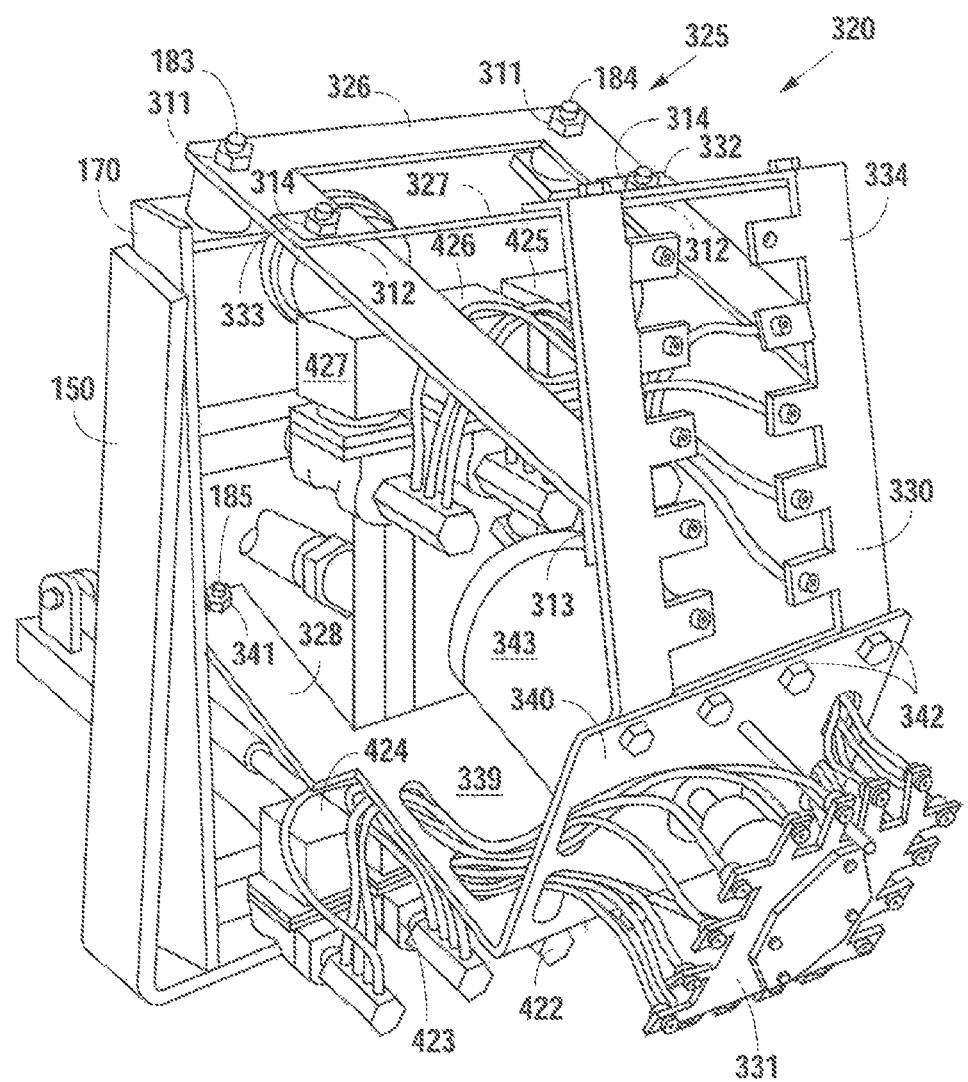
Figure 7C:
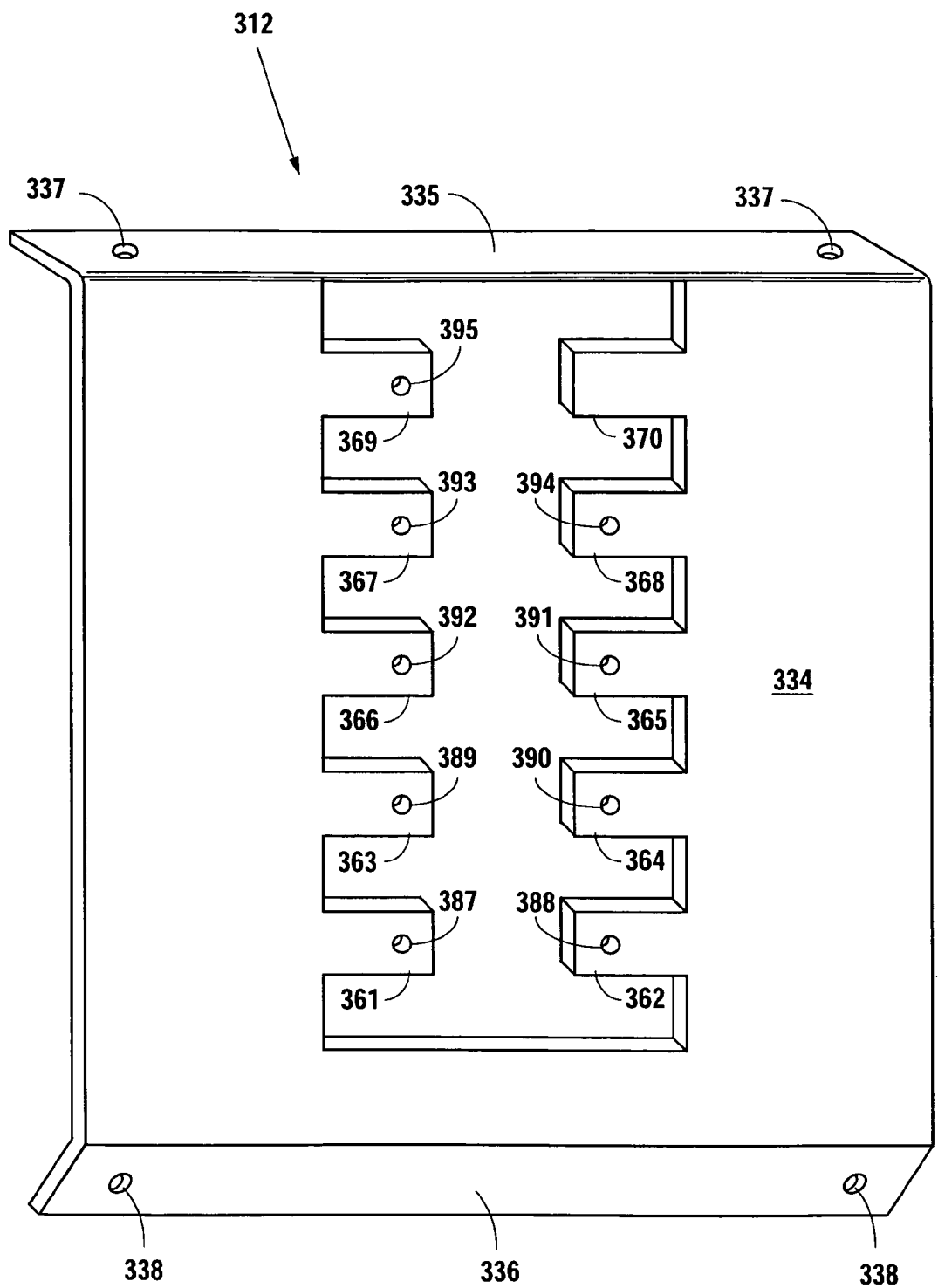
Figures 7D, 7E:
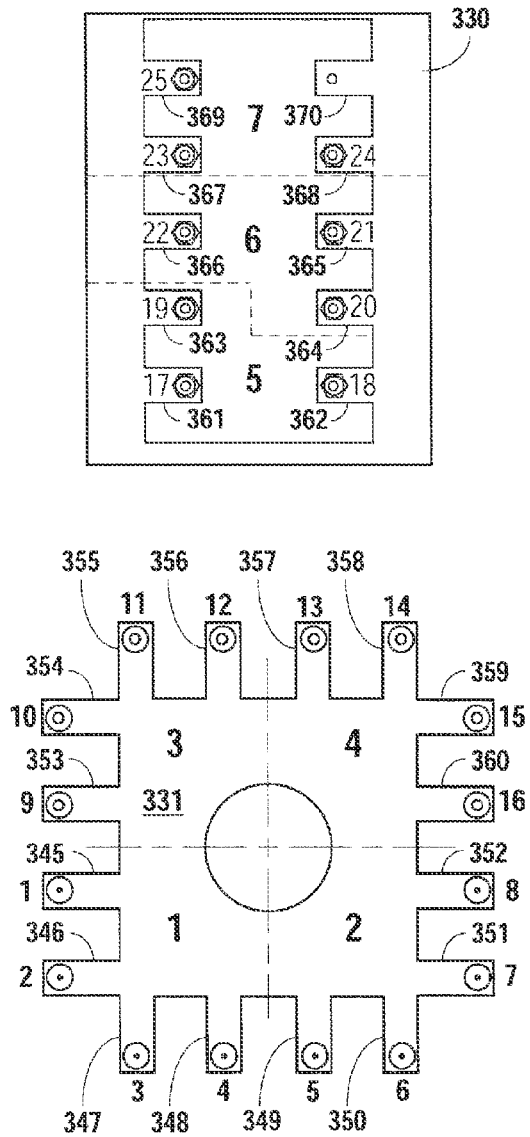
Figure 7F:
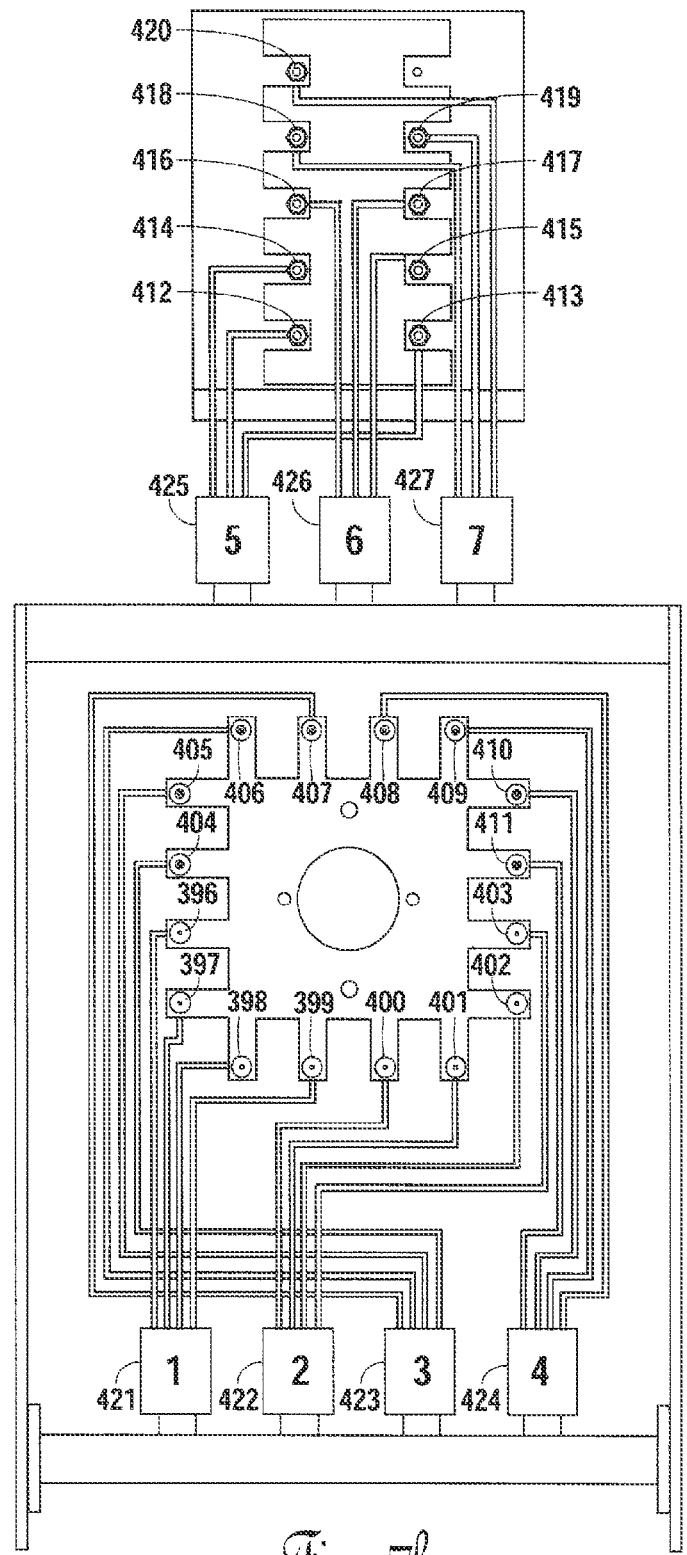

In similar fashion to the first embodiment, the spray system 320 includes first through seventh flow control units 421-427 disposed in an arrangement identical to the first embodiment, and, therefore, produce first through seventh swaths, respectively. As shown in FIG. 7d-e, the first flow control unit 421 is fluidly connected to the first through fourth nozzles 396-399; the second flow control unit 422 is fluidly connected to the fifth through eighth nozzles 400-403; the third flow control unit 423 is fluidly connected to the ninth through twelfth nozzles 404-407; the fourth flow control unit 424 is fluidly connected to the thirteenth through the sixteenth nozzles 408-411; the fifth flow control unit 425 is fluidly connected with the seventeenth through the nineteenth nozzle 412-414; the sixth flow control unit 426 is fluidly connected with the twentieth nozzle through the twenty second nozzle 415-417; and the seventh flow control unit 427 is fluidly connected with the twenty third through twenty fifth nozzles 418-420.

One of ordinary skill in the art will readily recognize that the operations of the first and second examples of the invention may be operated identically, either manually or through the use of a controller 106, as described in the first embodiment.

The use of monolithic registration plates 330-331 clearly provides advantages over registration plates formed from multiple components, because the number of components on the registration plates is reduced to one. As such, the registration plates include integral tabs that resonate with the registration plate, thereby delivering a consistent spray pattern, as well as a consistent swath when a spray vehicle is in motion.

Figure 8:
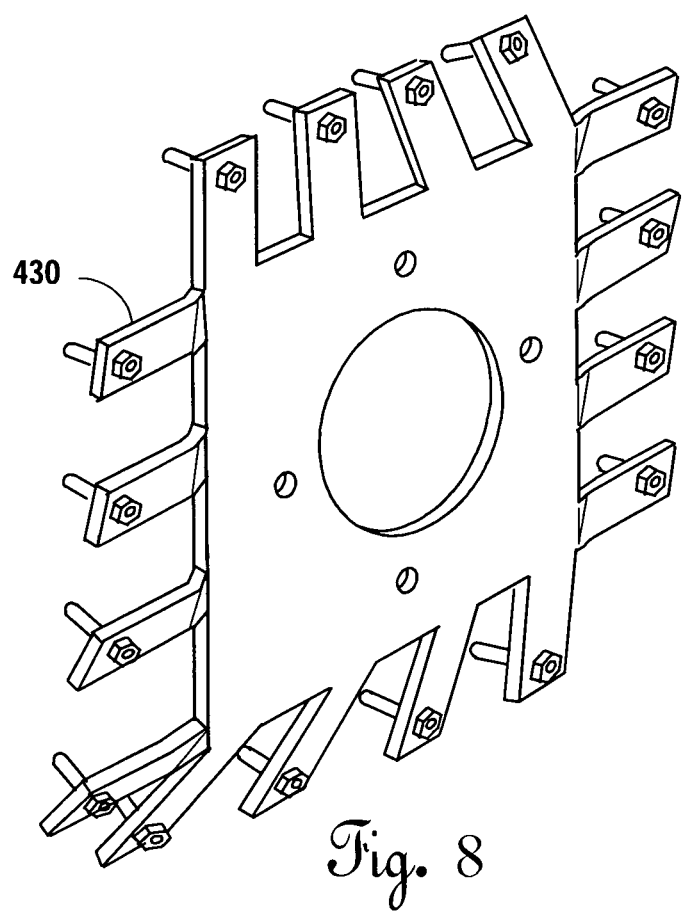

While this embodiment has been shown with tabs disposed in a planar orientation, one of ordinary skill in the art will recognize that various forms of registration plates may be utilized, and that registration plates in shapes other than planar may be desired, and should be construed as part of this invention. In particular, a tab 430 may be reoriented by bending, twisting, or the like, to deliver fluid in a particular direction, thereby creating a desired spray pattern, as shown in FIG. 8. One of ordinary skill in the art will further recognize that a registration plate utilizing both internal and external tabs is possible. The registration plates 213-214 are of a sufficient stiffness, such that they do not flex during a motion event, but the tabs may be reoriented with a predetermined amount of force. Additionally, a density of apertures for receiving the nozzles may be increased to deliver increased amounts of the desired fluid to a particular area.

Figure 9:
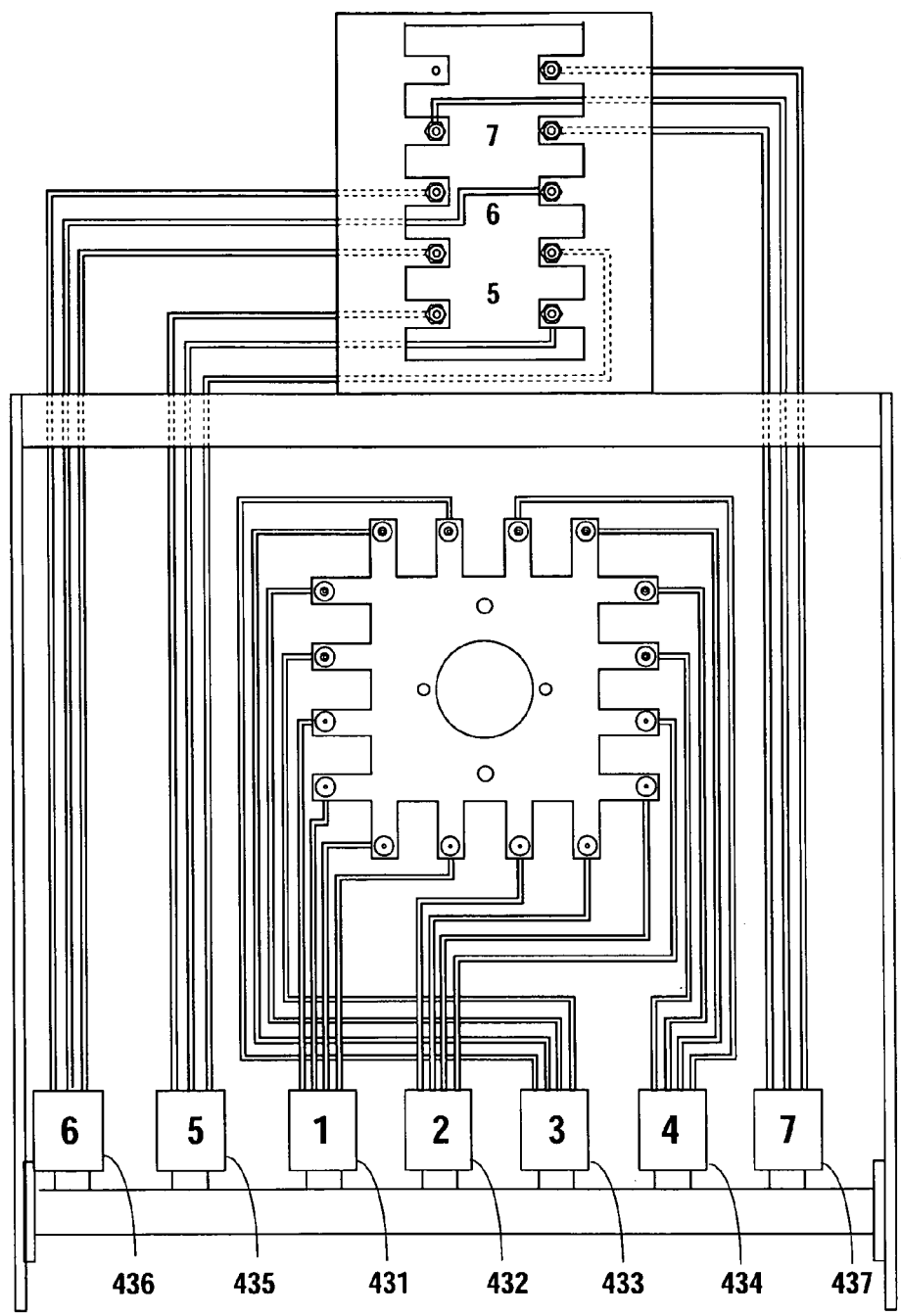

One of ordinary skill in the art will further recognize that the orientation of the flow control units may be adjusted to accommodate varying registration plate requirements. Illustratively, all of the flow control units 431-437 may be placed onto a lowest support member of the inner frame to provide clearance for increased size registration plates, as shown in FIG. 9. One of ordinary skill in the art will further recognize that the quantity of the flow control units may be increased or decreased, dependent upon flow/mixing requirements. As such, a single flow control unit in combination with a single nozzle is both possible and within the scope of this invention.

Figure 10:
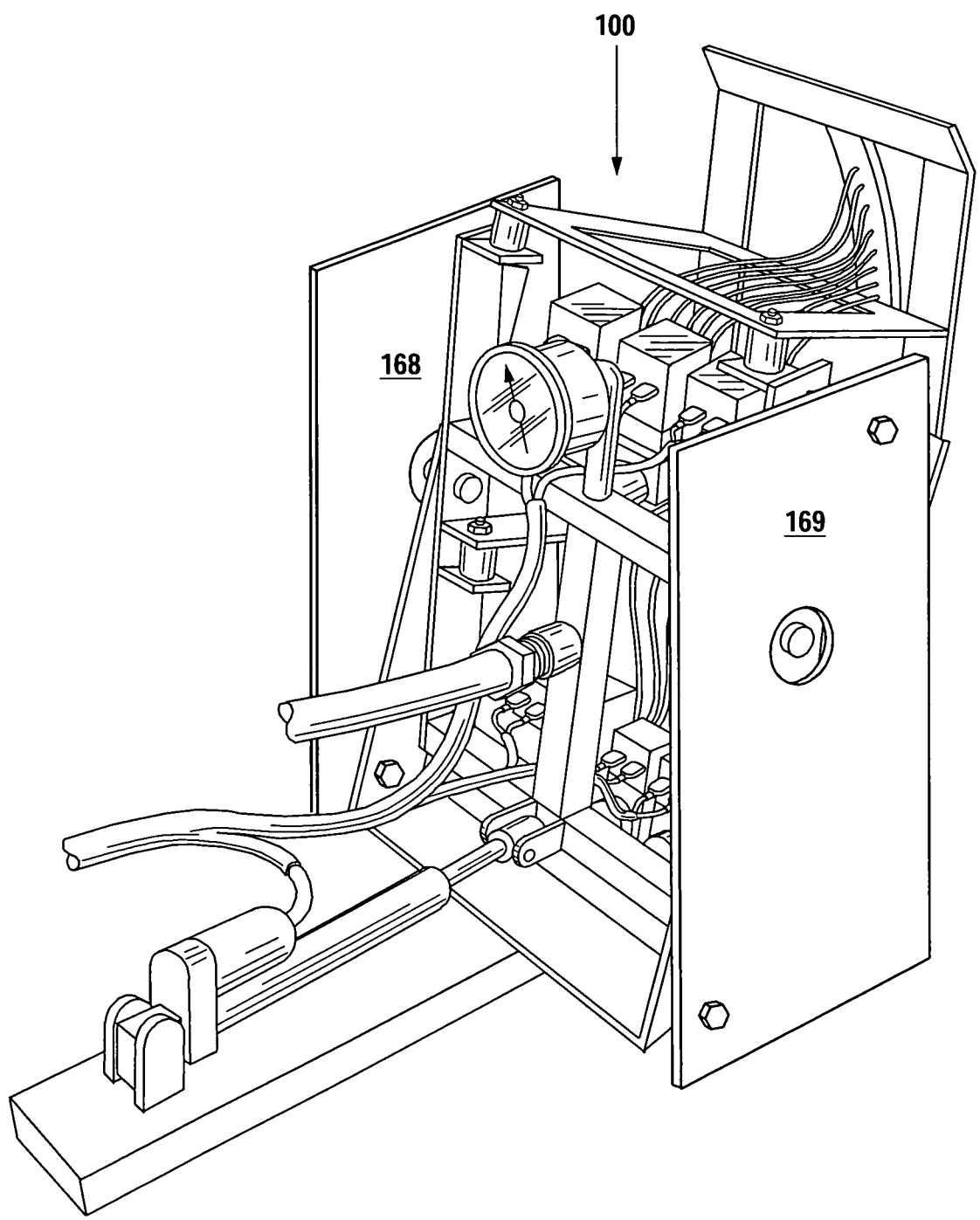

The first and second embodiments have been shown without protection from branches and wind. This invention may further include a first wind shear plate 168 and a second wind shear plate 169 to reduce the amount of wind experienced by the nozzles, and to protect the device from branches during use. As shown in FIG. 10, the first and second wind shear plates 168-169 may be secured to the base frame 150, the inner frame 170, or even the spray head frame 202, dependent upon configuration requirements.

While the first and second embodiments have been shown with a nutating motion applied to the first registration plate, one of ordinary skill in the art will recognize that an induced motion in a single plane is possible, as described in FIG. 2*e* of the first embodiment, and, therefore, should be considered part of this invention.

In a third embodiment, a vegetation engagement system 428 includes a spray system 450 having a spray unit similar to the spray unit 320 of the second embodiment mounted to a vegetation engagement device, however, the control system has been modified to more particularly address an implement/sprayer combination.

As shown in FIG. 11*a*, the vegetation engagement system 428 includes a service vehicle 456 pulling vegetation engagement device 457 with a spray unit 462 disposed on top of the vegetation engagement device 457. In this particular example of this third embodiment, the service vehicle 456 is a tractor. Tractors are routinely employed to cut or maintain a right-of-way disposed along a roadway 451. Due to the high costs of tractors, mowers, fuel, and labor, in many situations, maintenance crews make only a single pass next to the roadway 451, thereby leaving undesirable tall weeds or brush outside of a cut area. In this particular example of this third embodiment, the vegetation engagement device 457 is a rotary cutter, commonly known in the art as a "rotocycle," and includes a deck 454. While this third embodiment has been shown with a rotary cutter as the vegetation engagement device 457, one of ordinary skill in the art will recognize that other vegetation engaging implements may be utilized in combination with the spray unit 462, including mowers, shredders, and the like. One of ordinary skill in the art will further recognize that various sizes of tractors may be utilized to pull varying sizes of vegetation engagement devices.

The spray unit 462 is disposed on a side of the deck 454 that is opposite of the roadway 451, such that the sprayer unit 462 is able to deliver spray from the deck 454 of the vegetation engagement device 457 as the tractor passes over a first engagement zone 452 of a right of way. In this particular example, the first engagement zone 452 is disposed adjacent to the roadway 451, and is cut by the rotary cutter as the tractor or service vehicle 456 passes over the first engagement zone 452. Accordingly, a second engagement zone 453 is defined as the portion of right-of-way that lies within a spraying distance of the spray unit 462. As such, the second engagement zone 453 may be adjusted by activating or deactivating flow control units disposed on the spray unit 462, as described in the first and second embodiments of this disclosure. One of ordinary skill in the art will recognize that swaths controlled by flow control units may be delivered adjacent to each other to create a broader swath or treatment band. Accordingly, the spray unit 462 may deliver a single swath or multiple swaths disposed adjacent to or separate from each other.

The spray system 450 includes a portable storage tank 463, a control system 455, at least one product circuit 464 including a pump 459, and a by-pass circuit 466 including a pressure regulator 460. The portable storage tank 463 is known in the art, and is located on the deck 454. The portable storage tank 463 may be refillable, replaceable, and is rigidly secured to the deck 454 to prevent the storage tank 463 from becoming separated from the vegetation engagement device 457. The portable storage tank 463 includes an inlet for filling, and an outlet for connection to the product circuit 464. The product circuit 464 extends from the outlet of the storage tank 463 to an inlet of the spray unit 463. The pump 459 may be any form of pump known in the art, such as centrifuigal, roller, piston, diaphragm, and the like, provided the operating pressure ranges of the system are within the designed pressure ranges of the pump, and the liquids being pumped are compatible with the materials of the pump 459. In this particular example of the third embodiment, the pump 459 is disposed between the outlet of the storage tank 463 and the inlet of the spray unit 463.

The by-pass circuit 466 includes an inlet connected to the product circuit 464 between an outlet of the pump 459 and the inlet of the spray unit 462, and an outlet connected to the product circuit 464 between the outlet of the storage tank 463 and the inlet of the pump 459, thereby allowing elevated pressures in the product circuit 464 to vent through the pressure regulator 460, and to the lower pressure portion of the product circuit 464.

In this particular example of the third embodiment, the spray unit 462 includes a manifold having four outlets, wherein first through fourth flow control units 471-474 are connected, thereby placing the first through fourth flow control units 471-474 in fluid communication with the product circuit 464, for delivery to at least four nozzles 486-489, thereby generating four swaths that, collectively, form a wider swath than a single nozzle swath. While this example has been shown with multiple swaths that together form an increased width swath, one of ordinary skill in the art will recognize that the one or more of the swaths may be used, if desired, thereby delivering increased amounts of product to a particular portion of the second treatment zone 453.

In this particular example of the spray system 450, the spray unit 462 is disposed on a tower 479 to elevate the spray unit 462. The tower 479 may be any structure suitable to rigidly support the spray unit 462 during cutting, driving, and the like. In this particular example, the tower 479 is a structure welded from steel structural members. Alternatively, the spray unit 462 may be secured to the deck 454 of the implement 457.

The control system 455 includes a control unit 458 having a control panel 478 for housing control switches for ceasing and commencing the flow of the liquid disposed within the spray system 450. The control unit 458 includes a controller 461 electrically connected to a battery source of the service vehicle 456, and first through fourth swath activation switches 482-485 that are electrically connected to the first through fourth flow control units 471-474. The control panel 478 further houses a pump activation switch 481 for controlling the delivery of power to a pump driver that is engaged with the pump 459. In this particular example of the third embodiment, the control unit 458 is disposed in a cab 465 of the service vehicle 456, such that an operator may toggle the switches 481-485 from an operator's seat. While this particular embodiment has been shown with the control unit 458 disposed within the cab 465 of the service vehicle 456, one of ordinary skill in the art will recognize that the control unit 458 may be placed on the vegetation engagement device 457 in proximity to the spray unit 462, if required.

In this particular example, the product circuit 464, the pump 459, the regulator 460 and the by-pass circuit 466 are all disposed on the deck 454 of the vegetation engagement device 457, such that they are in close proximity to the spray unit 462.

While the components of the spray system 450 have been described as being disposed in particular locations, one of ordinary skill in the art will recognize that the components may be utilized in alternative locations, dependent upon equipment availability, storage requirements, and the like. As shown in FIGS. 11*d-f*, the various components may be disposed in a cab 465 of the service vehicle 456 or on the deck 454 of the vegetation engagement device 457 or on a trailer that is pulled behind the vegetation engagement device 457. FIG. 11*d* illustrates a spray system 450, wherein the spray unit 462 is disposed on a deck 454 of a vegetation engagement device 457, and a fluid storage tank 463 is disposed on a trailer 490. In this configuration, the control system 455 may be disposed on the deck 454, in the cab 465, or on the trailer 490. In an alternate configuration, as shown in FIG. 11*e*, the complete spray system 450 is disposed on a trailer 490. In a further option, as shown in FIG. 11*f*, the spray unit 462 and the water storage tank 463 are disposed on a trailer 490, and the control unit 458 is disposed within a cab 465 of the service vehicle 456, thereby allowing an operator to toggle the switches 481-485, as required. Still further, the diluent tank may be mounted on a front of the service vehicle or as saddle tanks. As such, one of ordinary skill in the art will recognize that multiple configurations are possible, and should be construed as part of this invention.

Figure 11C:
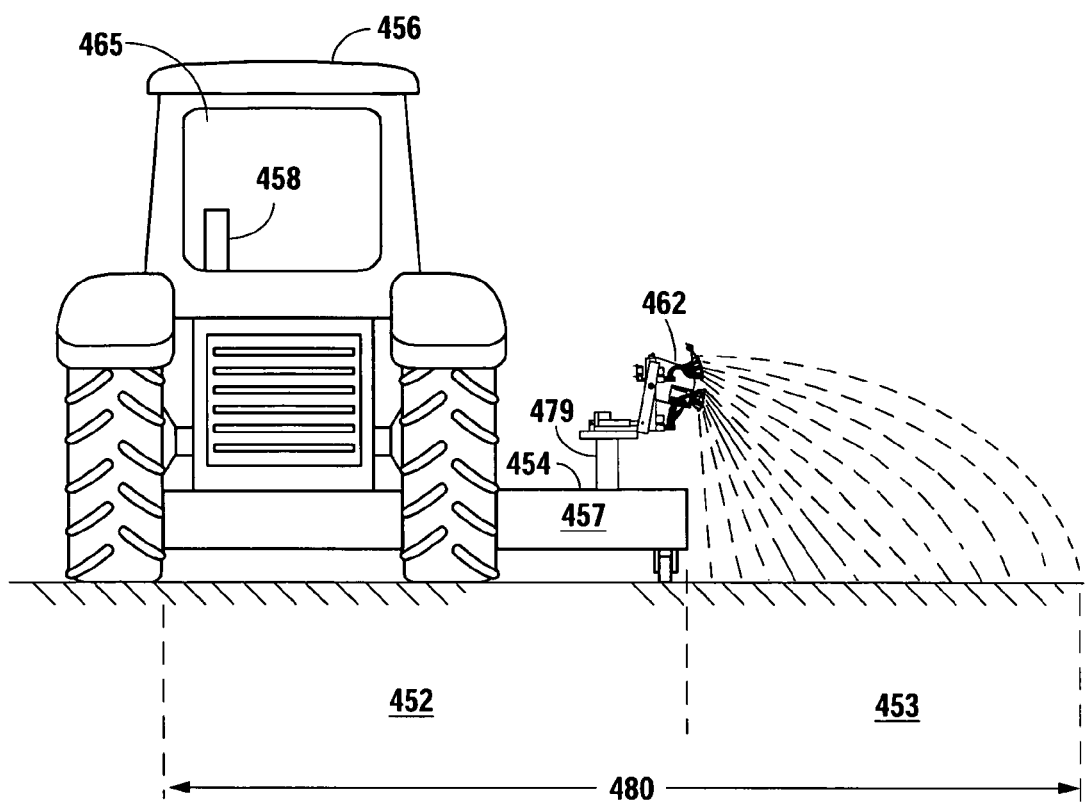

With the control system 455 described herein, an operator is only able to deliver a liquid that is disposed within the storage tank 463. The liquid may be a diluent, an herbicide, a growth retardant, a fertilizer, or a mixture thereof. The liquid remains in the storage tank 463 until the pump 459 is powered. Once the pump 459 is powered, the liquid is pressurized, forced to the spray unit 463, and moves through the first through fourth flow control units 471-474 and to the first through fourth nozzles 486-489, respectively, when the flow control units 471-474 are in an open position. As shown in FIG. 11c, the four streams are disposed adjacent to each other, thereby covering the entire cross-section of the second treatment zone 453. When the flow control units 471-474 are in a closed position, the flow of the liquid stops at the flow control units 471-474. One of ordinary skill in the art will recognize that a single flow control unit 471 may be opened or any combination of the flow control units 471-474 may be opened to deliver the liquid to a respective portion of the second treatment zone 453.

In use, the operator orients the service vehicle 456 along a roadway 451 and over a first treatment zone 452 of a right-of-way, such that the spray unit 462 is disposed on a side opposite the roadway 451 and facing the second treatment zone 453. The operator then commences the cutting of the vegetation with vegetation engagement device 457, and the spraying of the desired product through the spray unit 462 by activating switches 481-485 on the control panel 478. The operator then maneuvers the service vehicle 456 over the first treatment zone 452, thereby cutting the vegetation disposed in the first treatment zone 452, and, simultaneously, spraying vegetation disposed in the second treatment zone 453. As such, an extended treatment band 480 is created with the combination of the cutting and spraying action. The extended treatment band 480 width decreases the number of passes required to treat the right-of-way, thereby increasing efficiency and reducing the costs associated with the cutting action alone.

While this embodiment has been shown with first and second treatment zones disposed adjacent and parallel to each other, one of ordinary skill in the art will recognize that the first treatment zone and the second treatment zone may be slightly offset or may slightly overlap without detriment to the scope of this invention.

While this embodiment has been shown with a spray head mounted to a deck 454 of a vegetation engagement device 457, one of ordinary skill in the art will recognize that the spray head may be mounted to a side of the vegetation engagement device 457, or may be attached to a side of a service vehicle. One of ordinary skill in the art will further recognize that a regulator is not required, but the by-pass circuit broadens the range of acceptable working pressures.

The sprayer unit 462 may further include a motion inducer, as described n the first and second embodiments that provides motion in multiple planes to achieve droplet separation.

In an extension of the third embodiment, a vegetation engagement system 500 includes a vegetation engagement device 457, as described in the third embodiment, in combination with a spray system 550 that includes increased capabilities. One of ordinary skill in the art will recognize that some spray systems include additional features, such as variable motor speed control, ground speed radar or satellite positioning and control systems that adjust the amount of delivered chemical based upon vehicle speed.

Figure 11G:
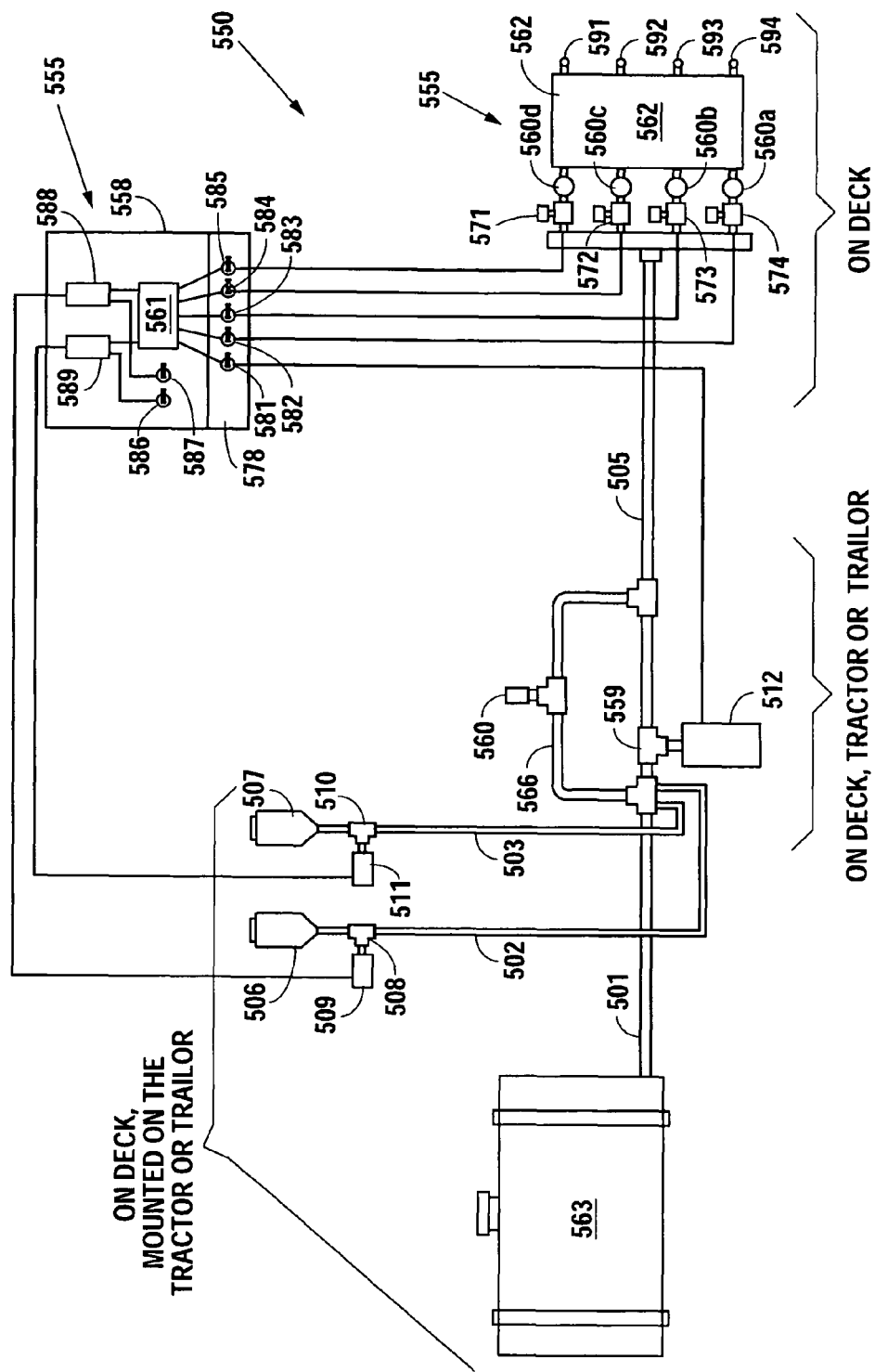
Figure 11B:
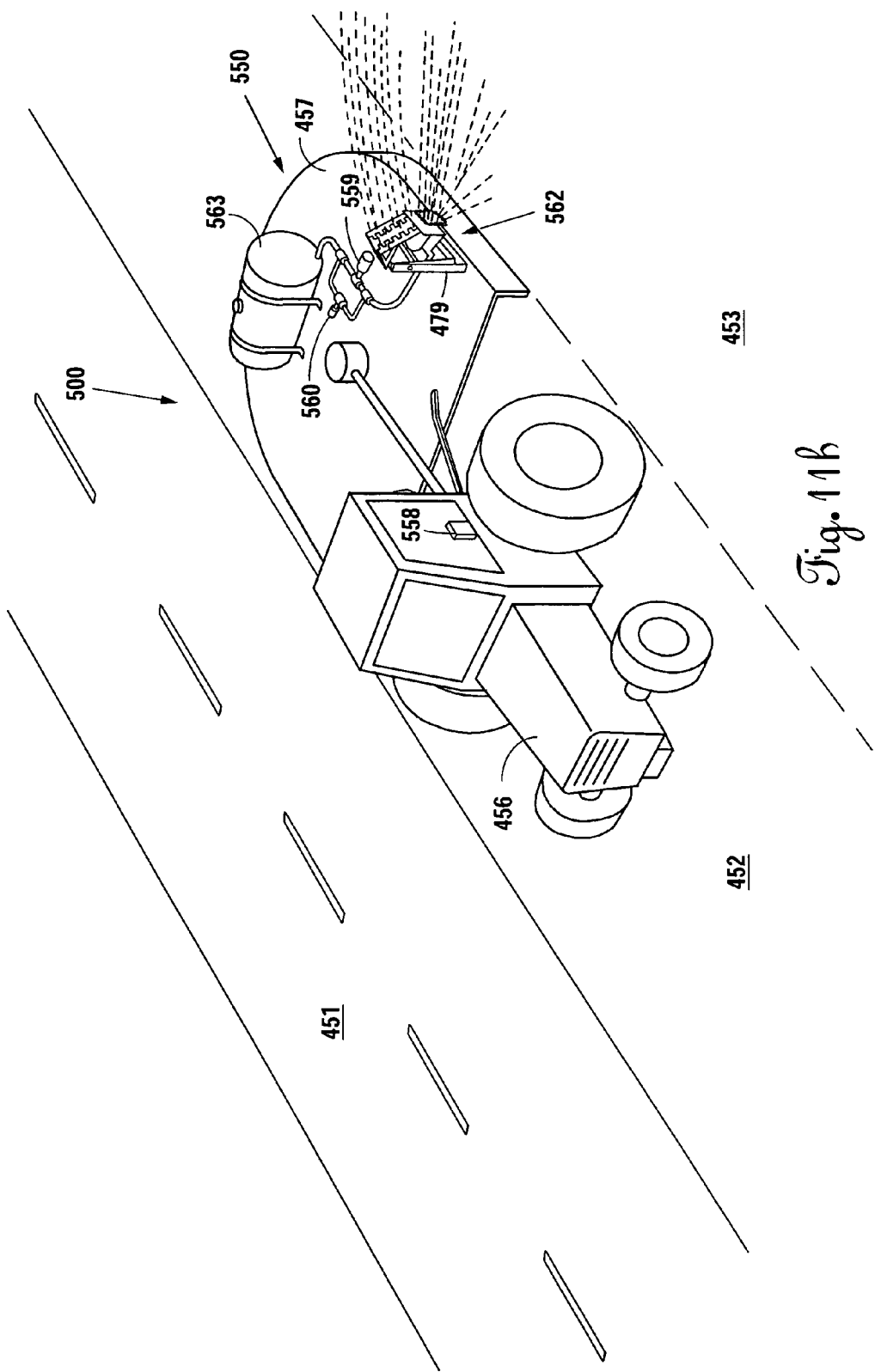

As shown in FIG. 11g, the spray system 550 includes a diluent circuit 501 that extends from an outlet of a storage tank 563 to an inlet of a pump 559, and a mixed product circuit 505 that extends from an outlet of the pump 559 to an inlet of the spray unit 562. The spray system 550 further includes a by-pass circuit 566 housing a pressure regulator 560, as described in the third embodiment, wherein excessive pressures from a pressurized side of the mixed product circuit 505 bleed to an unpressurized portion of the diluent circuit 501, thereby relieving excessive pressures. The spray system 550 further includes a first product circuit 502 and a second product circuit 503. The first product circuit 502 extends from a first concentrate source 506 to an inlet port disposed in an end of the diluent circuit 501 nearest the pump 559. The first product circuit 502 further includes a first injection pump 508 driven by a first pump driver 509. The second product circuit 503 extends from a second concentrate source 507 to an inlet port disposed in an end of the diluent circuit 501 nearest the pump 559. The second product circuit 503 further includes a second injection pump 510 driven by a second pump driver 511. In this particular example, the first and second pump drivers 509 and 511 are electric variable speed motors. As such, a corresponding pump speed is dependent upon a current delivered to the motor. In this particular example of this extension of the third embodiment, the injection pumps 508 and 510 are peristaltic pumps; however, one of ordinary skill in the art will recognize that virtually any form of pump may be utilized to deliver product from the concentrate sources 506-507 to the inlet of pump 559.

The spray unit 562 is substantially identical to the spray unit 462 of the third embodiment, and includes a manifold having four outlets, wherein first through fourth flow control units 571-574 are connected, thereby placing the first through fourth flow control units 571-574 in fluid communication with the mixed product circuit 505 for delivery to at least four nozzles 591-594, thereby generating four swaths that, collectively, form a wider swath than a single nozzle swath. While this example has been shown with multiple swaths that together form an increased width swath, one of ordinary skill in the art will recognize that the one or more of the swaths may slightly overlap, thereby delivering uniform amounts of product to the second treatment zone 453.

The control system 555 includes a control unit 558 having a control panel 578 for housing control switches for ceasing and commencing the flow of the liquid disposed within the spray system 550. The control unit 558 includes a controller 561 electrically connected to a battery source of the service vehicle, and first through fourth swath activation switches 582-585 that are electrically connected to the first through fourth flow control units 571-574. The control panel 578 further houses first and second chemical selection switches 586-587, respectively, and a mixed-product pump activation switch 581 for controlling the delivery of power to the pump driver 512 and the pump 459. The control panel 578 further includes a first pump motor speed control 588 that reads the speed of the injection pump and keeps the pump 509 at a correct revolution per minute based on the speed of the tractor, the swath width being sprayed, and the rate of concentrated product used per acre. The speed of the motor 509 increases or decreases as the three variables of speed, swath width, and rate per acre change. The control panel 578 still further includes a second pump motor speed control 589 for controlling the speed of the second pump driver 511.

In operation, a first product disposed within the first concentrate source 506 flows to the first injection pump 508, and a second product disposed within the second concentrate source 507 flows to the second injection pump 510. An operator must toggle at least one chemical selection switch 586 or 587 to power the first or second injection pump drivers 509 and 511, thereby powering either the first or second injection pump 510 or 512, respectively, or both may be selected. The operator must also energize the mixed product pump driver 512 by toggling the pump motor activation switch 581, thereby forcing a diluent to move from the storage tank 563 to mix with the initialized products. The operator must further activate any desired swaths by opening the respective flow control units 571-574, thereby allowing the mixed product to move through the flow control units and to the respective nozzles 591-594. Excessive pressures move through the regulator 560 disposed in the bypass circuit 566, thereby relieving the high-pressure end of the spray system 550. While this embodiment has been shown with a bypass circuit 566, one of ordinary skill in the art will recognize that the bypass circuit 566 is not required.

Alternatively, the spray system 550 may be operated in a semi-automatic mode, wherein the controller 561 monitors a speed of the service vehicle 556, a width of the spray swath being delivered, and the rate of chemical selected to determine the precise speed or revolutions per minute of the injection pumps 508 or 510 for all combinations of the three variables. In this mode, the controller 561 adjusts the current applied to the pump drivers 509 and 511 to adjust the injection pump speeds 508 and 510.

Use of the vegetation engagement system 500 is substantially identical to the vegetation engagement system of the third embodiment, wherein a first treatment zone 452 is cut and a second treatment zone 453 is sprayed to create an extended treatment band 480, and, therefore, will not be further described.

While this extension of the third embodiment has been shown with a pressure regulator 560 disposed in a bypass circuit 566, one of ordinary skill in the art will recognize that regulators 560a-560d may be placed at an outlet end of the flow control units 571-574, as shown in FIG. 11g.

While the third embodiment and extension of the third embodiment have been shown with examples of spray systems and specific configurations of spray units, one of ordinary skill in the art will recognize that virtually any form of spray unit may be utilized to create an extended treatment band formed from a first zone created by cutting vegetation and a second zone created by spraying vegetation, and, therefore, should be construed as part of this invention.

Figure 1B:
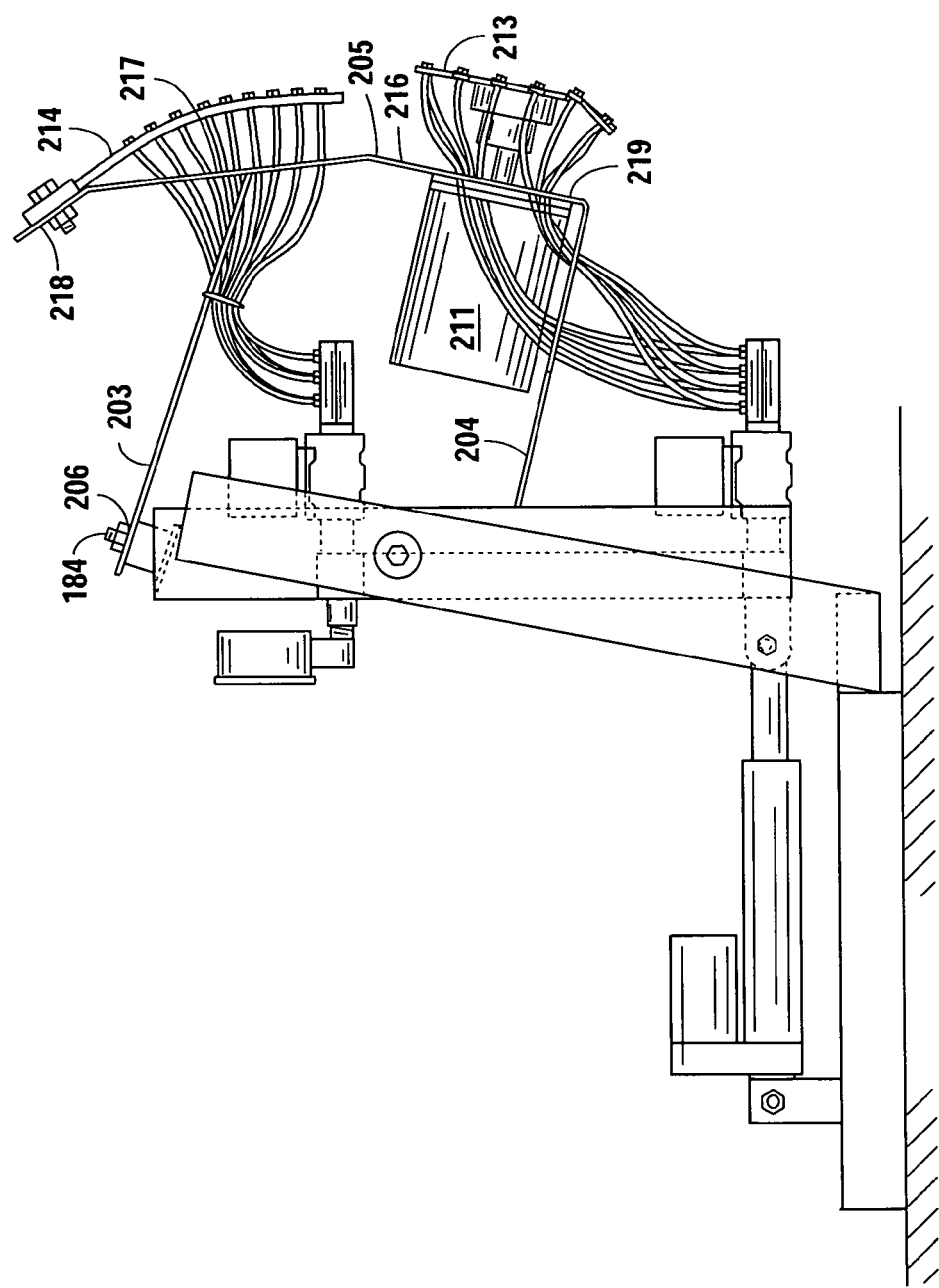

In a fourth embodiment, a vegetation engagement system similar to the third embodiment utilizes a spray head, as described in U.S. Pat. No. 5,167,369, the disclosure of which is hereby incorporated by reference. U.S. Pat. No. 5,167,369 utilizes a mechanized spraying apparatus mountable to a mobile vehicle. As shown in FIG. 1 of the referenced patent, a spray apparatus 10 is disposed on a motor vehicle V, and includes a liquid supply means and pumping means for delivering at least one swath from the motor vehicle V through the use of a control system controlling a solenoid bank and an electromagnet.

In this fourth embodiment, a vegetation engagement system 600 includes a service vehicle 456, as described in the previous embodiments, wherein the service vehicle 456 includes a vegetation engagement device 557 to engage vegetation in a first treatment zone and a spray system 650 that delivers at least one fluid in at least one swath to a second treatment zone. In the example illustrated, the vegetation engagement device 557 is a rotary mower that cuts vegetation as the vegetation engagement device 557 passes over the vegetation.

The spray system 650 is similar to the spray systems of the previous embodiments, wherein the spray system stores a product or products, pressurizes the product or products, and delivers the product or products in a controlled fashion through flow control units disposed in a spray unit, thereby delivering the fluid through the flow control units when the flow control units are in an open position, and ceasing the flow of the fluid when the flow control units are in a closed position. However, the spray system 650 is, additionally, adapted to alternately energize an electromagnet to force an attractor disposed on a spray arm to be drawn toward the electromagnet, thereby forcing the spray arm to move.

Figure 12A:
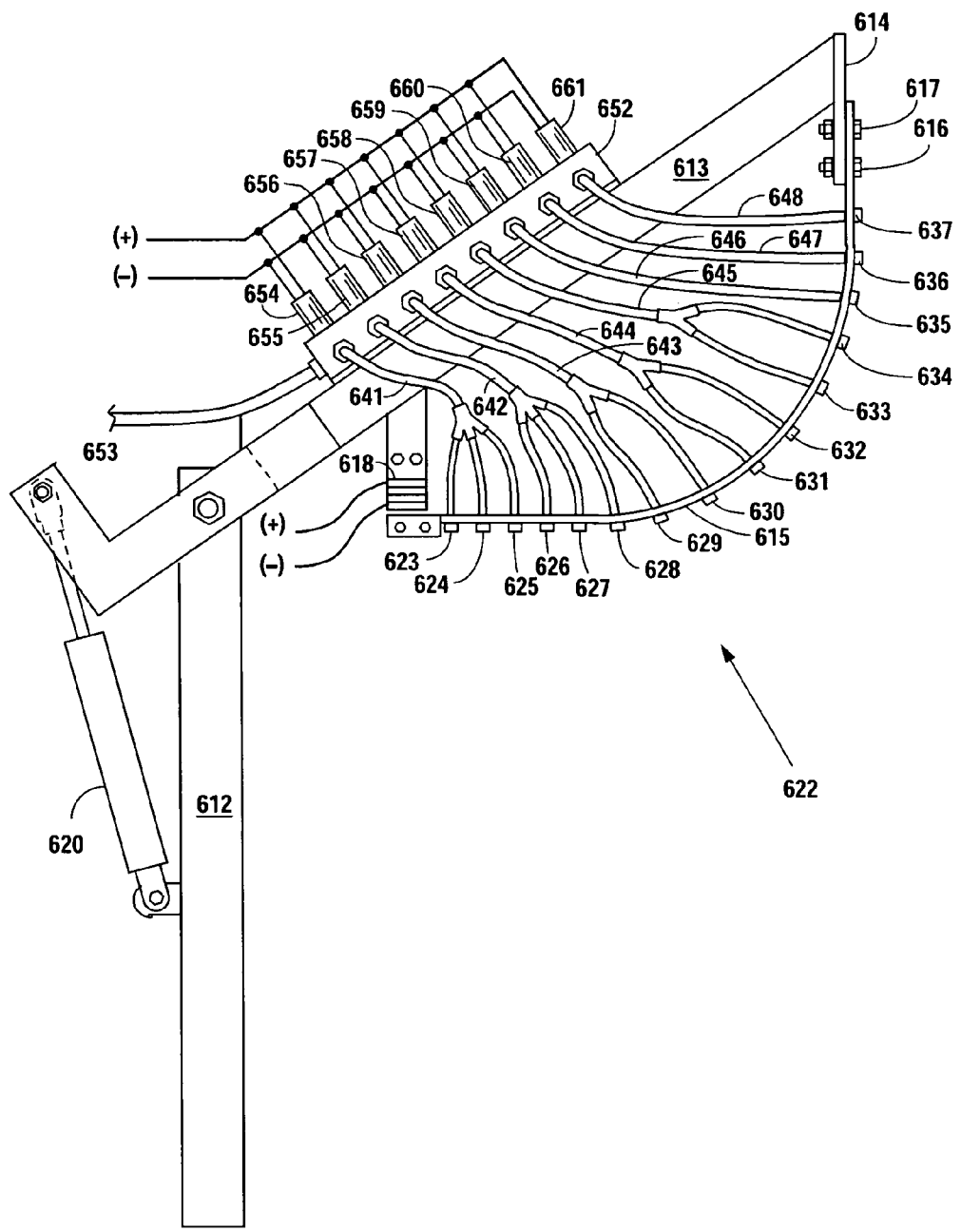

As shown in FIG. 12a, a spray unit 622, of similar construction to the spray head 22 of the referenced patent has been renumbered and renamed to align the spray head 22 with the current disclosure. The spray unit 622 includes a support 612, a spray head support 613 rotatably connected to the support 612, and a cylinder means 620 connected to both supports, whereby the cylinder means 620 is actuated to move the spray head support 613, thereby adjusting a spray angle.

The spray unit 622 further includes a solenoid bank 652 that houses flow control units 654-661. An inlet of the solenoid block 652 is in fluid communication with a supply line 653, thereby delivering at least one fluid to the solenoid block 652 when the supply line 653 is pressurized. The flow control units 654-661 are connected to inlets of flexible lines 641-648, and the outlets of the flexible lines are connected to nozzles 623-637. The spray unit 622 further includes electrical communication equipment, thereby providing the ability to remotely activate the flow control units, either manually or through a control system.

The spray unit 622 further includes an electromagnet 618 extending from the spray head support member 613. The electromagnet 618 includes positive and negative terminals, and, therefore, the electromagnet 618 may be alternately energized by placing voltage across the terminals.

The spray unit 622 further includes a spray arm 615 similar to the spray arm 15 disclosed in the referenced patent. The spray arm 615 includes a plate portion 619 that has apertures 662 for restraining the nozzles 623-637. The plate portion 619 is formed from stainless steel to aid in corrosion resistance and to reduce the incidence of cracking and breaking. In this fourth embodiment, the nozzles 623-637 are secured to the plate portion 619 of the spray arm 615 in similar fashion to the first through third embodiments, whereby they are rigidly secured to the spray arm 615, and, therefore, are removable. In similar fashion to the referenced patent, the plate portion 619 is connected to a support bracket 614 at a restraint slot 663, and, in this particular example, the plate portion 619 is shaped so that it curves underneath the spray head support frame 613 in such a manner that it's unconnected end 665 is in close proximity to electromagnet 618 which is secured to the lower underneath portion of spray head support member 613.

Restraint slot 663 receives fasteners 616 and 617. The plate portion 619 further includes a nozzle slot 664 for aiding in the adjustment of the placement of nozzles delivering fluid to the furthest swaths, a first side plate 666, and a second side plate 667. The side plates 666-667 are rectangular plates that are formed from stainless steel, and are welded to the unconnected end 665 of the plate portion 619, such that a cavity 669 is disposed between the side plates 666 and 667. In this particular example of the fourth embodiment, the side plates 666-667 include a first end 668 and a second end 669, and first and second restraint apertures 670 and 671, respectively. The first restraint apertures 670 are disposed collinearly, such that a fastener 673 may pass through the first restraint apertures 671. The spray arm 615 still further includes an attractor 675. As shown in FIG. 12c, the attractor 675 is of a shape complementary to a space between the side plates 666 and 667 of the spray arm 615. In this particular example, the attractor 675 is block shaped, and includes a width 678, a length 679, and a height 680. In this particular example of the fourth embodiment, the width 678 is less than a distance between the side plates 666 and 667, and the height 680 is complementary to a portion of a height of the side plates 666-667. The length 679 of the attractor 675 is slightly less than a distance between the first end 668 of the side plates 666-667 and the unsupported end 665 of the plate portion 619, such that a gap 674 is disposed between the attractor 675 and the unsupported end 665. The attractor 675 further includes a first restraint aperture 676 and a second restraint aperture 677 that extend parallel to the width dimension. The first and second restraint apertures 676 and 677 are disposed collinearly with the first and second restraint apertures 670 and 671, respectively. As such, the attractor 675 may be placed between the side plates 666 and 667, and fasteners 673 may pass through the first side plate 666, the attractor 675, and the second side plate 667, thereby secure the attractor 675 in position when a nut, or other suitable restraint, is installed onto the fasteners 673.

The spray arm 615 still further includes a coating 681 disposed over the side plates 666-667, the attractor 675, the fasteners 673, any attached nuts, and the welded portion of the spray arm 615. The coating 681 extends beyond the second ends 669 of the spray plates 666-667, thereby filling the gap 674 disposed between the attractor 675 and the unsupported end 665 of the plate portion 619, and covering at least a portion of the curved plate portion 619 disposed nearest the second ends 669 of the side plates 666-667. In this particular example of the fourth embodiment, the coating 681 is a vulcanizing compound or plastic compound, whereby the coating 681 dries onto the exposed surfaces of the spray arm 615. As such, the coating 681 prevents contact between sprayed fluids and the coated surfaces. The coating 681 is of a thickness that does not degrade the electromagnetic attraction of the attractor 675 to the electromagnet 618, and, therefore, the unsupported end of the spray arm 615 advances toward the electromagnet 618 or is repelled from the electromagnet 618 when the electromagnet 618 is alternately energized.

Operation of the spray unit 622 is substantially identical to the spray head 22 of the referenced patent, wherein the electromagnet is alternately energized and de-energized by a variable power source, thereby forcing the spray arm 615 to vibrate or nutate, dependent upon an orientation of the electromagnet 618.

In use, the vegetation engagement system 600 includes a vegetation engagement device 557 passing over a first engagement zone 452 to cut vegetation disposed within the first engagement zone 452, and a spray system 650 disposed on the vegetation engagement device 557 to deliver at least one fluid to a second engagement zone 453, wherein the spray system 650 includes a spray unit 622. As described in the previous embodiments, the at least one fluid may be stored in a tank 563 that is coupled to the supply line 653, wherein the supply line 653 is pressurized through the use of a pump, wherein the pump is disposed in proximity to the spray unit 622. The spray system 650 may further include a by-pass circuit housing a regulator 560, thereby preventing excessive pressure buildups. The spray system 650 further includes a control unit 558 for housing a controller, system software, and a control panel that is accessible by an operator of the service vehicle 456. As described in the previous embodiments, the components may be situated in different areas of the service vehicle, the vegetation engagement device 557, or may be disposed on a trailer and pulled behind the service vehicle, the vegetation engagement device 557, or a combination thereof.

In this particular example, the spray unit 622 includes eight flow control units 654-661, thereby providing the ability to deliver eight swaths individually, together, or in any combination thereof, dependent upon the activation of the flow control units 654-661.

While this fourth embodiment has been shown with multiple flow control units, one of ordinary skill in the art will recognize that a single flow control unit may be utilized to deliver a single swath.

While this fourth embodiment has been shown with a single attractor disposed between the side plates 666 and 667, one of ordinary skill in the art will recognize that multiple attractors formed from thinner plates may be utilized to achieve a predetermined attraction force, as well as a desired displacement.

While this fourth embodiment has been shown with a gap 674 disposed between the attractor 675 and the unsupported end 665, one of ordinary skill in the art will recognize that the gap 674 is not required.

Figure 12B:
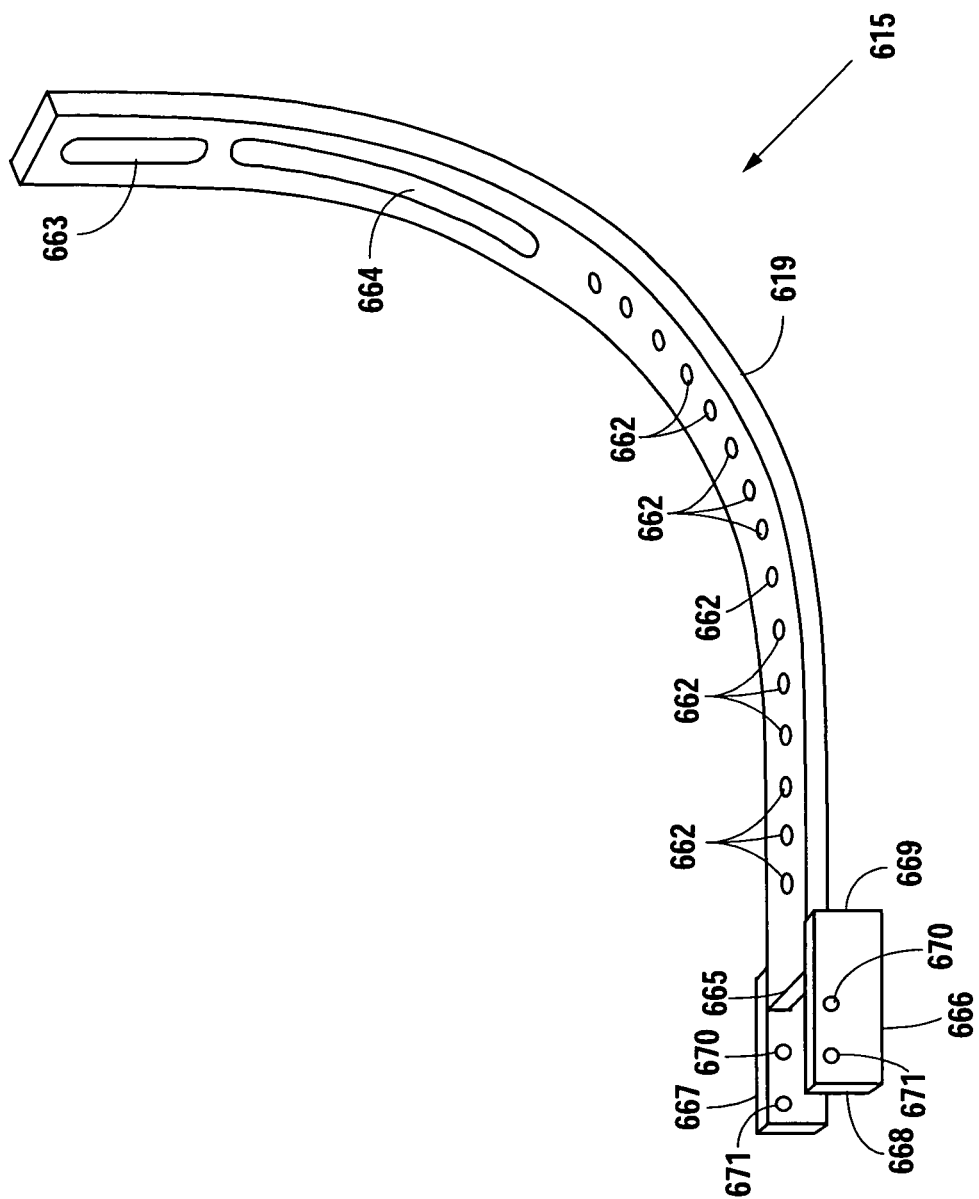
Figure 12:
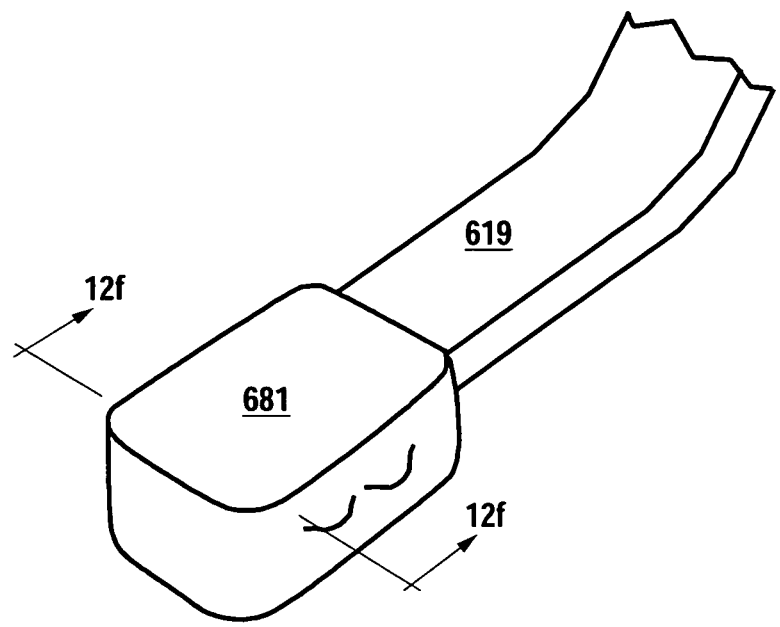
Figure 12:
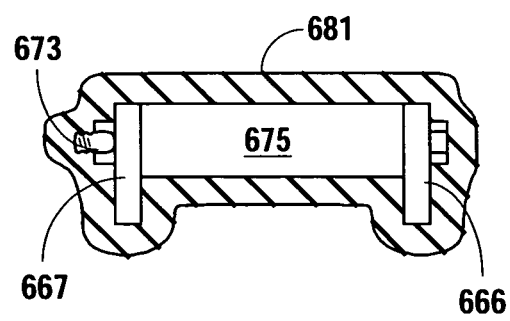

The improved vibration arm in FIG. 12b may be utilized in U.S. Pat. No. 5,167,369 to eliminate corrosion and breakage of the mild steel arm.

Although the present invention has been described in terms of the foregoing preferred embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing detailed description; rather, it is defined only by the claims that follow.

I claim:

1. A spray system, comprising:
   a first frame adaptable to a service vehicle;
   a second frame connected to the first frame;
   a spray head frame connected with the second frame;
   a motion inducer mounted to the spray head frame;
   a registration plate coupled with the motion inducer, the registration plate comprising at least a first tab with an aperture therein and a second tab with an aperture therein;
   a first nozzle secured in the aperture of the first tab and a second nozzle secured in the aperture of the second tab, whereby the first and second tabs provide a rigid mount for the coupling of the first and second nozzles with the registration plate;
   a first flow control unit mounted on the second frame, the first flow control unit fluidly coupled to a fluid source and to the first and second nozzles to deliver a fluid from the fluid source to the first and second nozzles when the first flow control unit is in an on position and cease the delivery of the fluid when the first flow control unit is in an off position; and
   the motion inducer induces a motion to the registration plate during the delivery of fluid to the first and second nozzles by the first flow control unit to create droplet separation as the fluid exits the first and second nozzles, wherein the first flow control unit is isolated from the motion produced by the motion inducer due to its mounting on the second frame.

2. The spray system according to claim 1, wherein the first tab and the second tab are formed integrally with the registration plate such that the first and second tabs remain rigid and do not move during a motion event, thereby delivering a consistent spray pattern.

3. The spray system according to claim 1, wherein:
   the first tab and the second tab are bendable for motion in a first plane and twistable for motion in a second plane;
   movement of the first tab in both the first plane and the second plane directs the first nozzle to provide spray coverage at a first location; and
   movement of the second tab in both the first plane and the second plane directs the second nozzle to provide spray coverage at a second location, thereby facilitating the creation of a desired spray pattern.

4. The spray system according to claim 1, wherein the first flow control unit comprises:
   a valve;
   a valve actuator disposed in the valve; and
   a manifold, comprising:

an inlet port connected at an outlet of the valve,
a first outlet port fluidly connected with the first nozzle, and
a second outlet port fluidly connected with the second nozzle.

5. The spray system according to claim 2, wherein first and second outlet ports of the first flow control unit are disposed upward, thereby reducing residual hose volume.

6. The spray system according to claim 1, further comprising:
the registration plate comprising a third tab with an aperture therein and a fourth tab with an aperture therein;
a third nozzle secured in the aperture of the third tab and a fourth nozzle secured in the aperture of the fourth tab, whereby the third and fourth tabs provide a rigid mount for the coupling of the third and fourth nozzles with the registration plate;
a second flow control unit mounted on the second frame, the second flow control unit fluidly coupled to a fluid source and to the third and fourth nozzles to deliver a fluid from the fluid source to the third and fourth nozzles when the second flow control unit is in an on position and cease the delivery of the fluid when the second flow control unit is in an off position; and
the motion inducer induces a motion to the registration plate during the delivery of fluid to the third and fourth nozzles by the second flow control unit to create droplet separation as the fluid exits the third and fourth nozzles, wherein the second flow control unit is isolated from the motion produced by the motion inducer due to its mounting on the second frame.

7. The spray system according to claim 6, wherein the third tab and the fourth tab are formed integrally with the registration plate such that the third tab and the fourth tabs remain rigid and do not move during a motion event, thereby delivering a consistent spray pattern.

8. The spray system according to claim 6, wherein:
the first, second, third, and fourth tabs are bendable for motion in a first plane and twistable for motion in a second plane;
movement of the first tab in both the first plane and the second plane directs the first nozzle to provide spray coverage at a first location;
movement of the second tab in both the first plane and the second plane directs the second nozzle to provide spray coverage at a second location;
movement of the third tab in both the first plane and the second plane directs the third nozzle to provide spray coverage at a third location;
movement of the fourth tab in both the first plane and the second plane directs the fourth nozzle to provide spray coverage at a fourth location, thereby facilitating the creation of a desired spray pattern.

9. The spray system according to claim 6, wherein the second flow control unit comprises:
a valve;
a valve actuator disposed in the valve; and
a manifold, comprising:
an inlet port connected at an outlet of the valve,
a first outlet port fluidly connected with the third nozzle, and
a second outlet port fluidly connected with the fourth nozzle.

10. The spray system according to claim 9, wherein first and second outlet ports of the second flow control unit are disposed upward, thereby reducing residual hose volume.

11. The spray system according to claim 1, wherein the coupling of the registration plate to the motion inducer reduces a working load on the motion inducer.

12. The spray system according to claim 1, further comprising a second registration plate disposed on the spray head frame, wherein the motion inducer induces a motion to the second registration plate.

13. The spray system according to claim 1, further comprising an actuator coupled to the first frame and the second frame, whereby the second frame pivots relative to the first frame when the actuator is energized.

* * * * *